US 9,113,005 B2

(12) United States Patent
Ochi

(10) Patent No.: US 9,113,005 B2
(45) Date of Patent: Aug. 18, 2015

(54) IMAGE FORMING APPARATUS AND IMAGE FORMING SYSTEM FOR SECURE TRANSMISSION OF IMAGE DATA

(71) Applicant: Oki Data Corporation, Tokyo (JP)

(72) Inventor: Kengo Ochi, Tokyo (JP)

(73) Assignee: Oki Data Corporation, Tokyo (JP)

(*) Notice: Subject to any disclaimer, the term of this patent is extended or adjusted under 35 U.S.C. 154(b) by 0 days.

(21) Appl. No.: 14/464,110

(22) Filed: Aug. 20, 2014

(65) Prior Publication Data
US 2014/0355041 A1    Dec. 4, 2014

Related U.S. Application Data

(63) Continuation of application No. 12/773,381, filed on May 4, 2010, now abandoned.

(30) Foreign Application Priority Data

May 8, 2009    (JP) .................. 2009-113189

(51) Int. Cl.
*G06K 15/00*    (2006.01)
*H04N 1/00*    (2006.01)
(Continued)

(52) U.S. Cl.
CPC ....... *H04N 1/00214* (2013.01); *H04N 1/00095* (2013.01); *H04N 1/33307* (2013.01); *H04N 1/4413* (2013.01); *H04N 1/4433* (2013.01); *H04N 2201/0081* (2013.01)

(58) Field of Classification Search
CPC .......... H04N 1/00795; H04N 1/00965; H04N 1/00968; H04N 1/32486; H04N 1/4433; H04N 1/444; H04N 1/6011; H04N 2201/3222; H04N 2201/3269

USPC .................................. 358/1.1–3.29
See application file for complete search history.

(56) References Cited

U.S. PATENT DOCUMENTS 6,580,726 B1    6/2003  Kumpf et al.
2002/0157028 A1* 10/2002 Koue et al. ............ 713/202
(Continued)

FOREIGN PATENT DOCUMENTS

JP    09-149256 A    6/1997
JP    2000-112867 A    4/2000
(Continued)

OTHER PUBLICATIONS

Office Action issued Jul. 20, 2012 in U.S. Appl. No. 12/773,381.
(Continued)

*Primary Examiner* — Martin Mushambo
*Assistant Examiner* — Marcellus Augustin
(74) *Attorney, Agent, or Firm* — Panitch Schwarze Belisario & Nadel LLP

(57) ABSTRACT

An image transmission apparatus includes an original document reading unit, an operation unit, a receiving unit, and a control unit. The original document reading unit reads an original document, and produce image data. The operation unit receives an input of a first password. The receiving unit receives request information including a second password from an information processing apparatus. The control unit controls the original document reading unit to read the original document based on the request information, and transmit the image data to an external device, the control unit restricts transmission of the image data to the external device if the first password does not correspond to the second password.

12 Claims, 20 Drawing Sheets

(51) Int. Cl.
*H04N 1/44* (2006.01)
*H04N 1/333* (2006.01)

(56) References Cited

U.S. PATENT DOCUMENTS

| | | | |
|---|---|---|---|
| 2003/0019922 A1* | 1/2003 | Kuo et al. | 235/375 |
| 2004/0203604 A1* | 10/2004 | Pugliese | 455/411 |
| 2007/0146801 A1 | 6/2007 | Sugawara | |
| 2008/0018957 A1* | 1/2008 | Suzuki | 358/474 |
| 2008/0151286 A1 | 6/2008 | Matsuo | |
| 2008/0172358 A1 | 7/2008 | Has | |
| 2008/0239385 A1 | 10/2008 | Suzuki et al. | |
| 2008/0278437 A1 | 11/2008 | Barrus et al. | |
| 2009/0190163 A1* | 7/2009 | Sato | 358/1.15 |
| 2009/0271839 A1 | 10/2009 | Kanai et al. | |

FOREIGN PATENT DOCUMENTS

| | | |
|---|---|---|
| JP | 2001-268307 A | 9/2001 |
| JP | 2004-072260 A | 3/2004 |
| JP | 2009-177547 A | 8/2009 |

OTHER PUBLICATIONS

Office Action issued Jan. 7, 2013 in U.S. Appl. No. 12/773,381.
Office Action issued Oct. 9, 2013 in U.S. Appl. No. 12/773,381.
Office Action issued May 20, 2014 in U.S. Appl. No. 12/773,381.

* cited by examiner

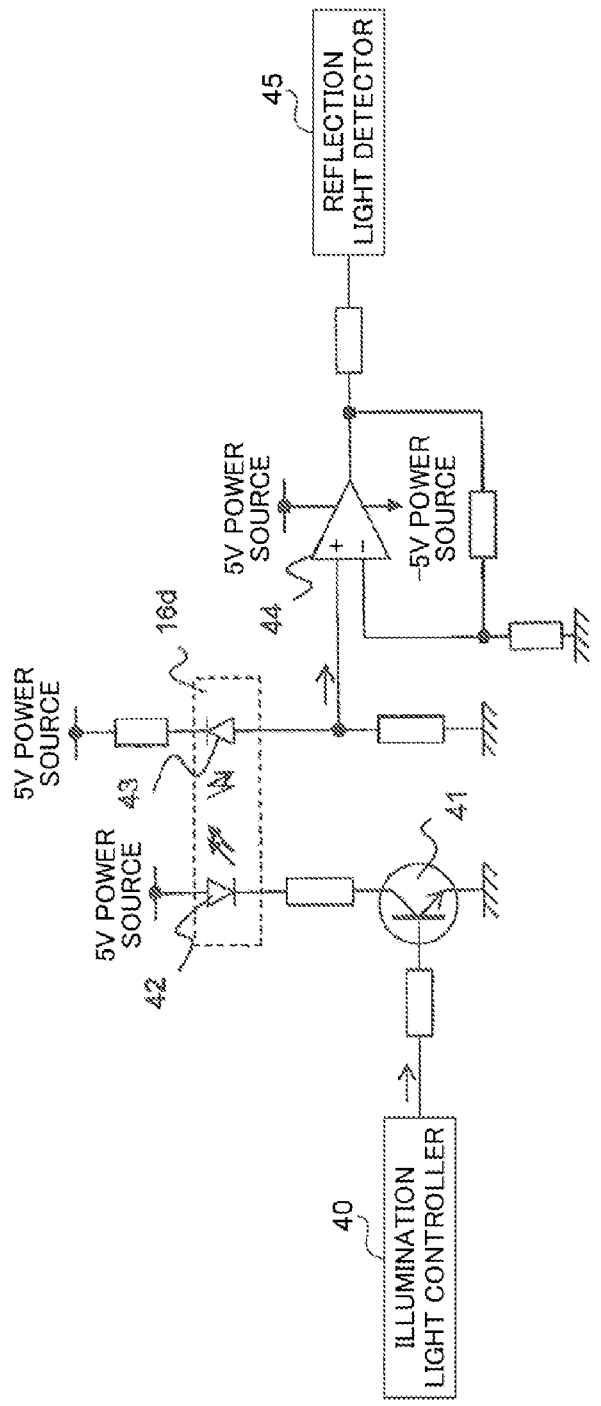

FIG. 9

| CD11 | CD12 | CD13 | CD14 | CD15 |
|---|---|---|---|---|
| DESTINATION | SCAN MODE | COLOR MODE | ORIGINAL DOC. SIZE | RESOLUTION |
| 192.168.100.101 | ADF | Color 24bit | A4 | 300dpi |

| DESTINATION | IDENTIFICATION DATA | SCAN MODE | COLOR MODE | ORIGINAL DOC. SIZE | RESOLUTION |
|---|---|---|---|---|---|
| 192.168.100.102 | PASSWORD | ADF | Color 24bit | A4 | 300dpi |

CD31 — DESTINATION
CD32 — IDENTIFICATION DATA
CD33 — SCAN MODE
CD34 — COLOR MODE
CD35 — ORIGINAL DOC. SIZE
CD36 — RESOLUTION
CD30

FIG.20

| DESTINATION | IDENTIFICATION DATA | SCAN MODE | COLOR MODE | ORIGINAL DOC. SIZE | RESOLUTION |
|---|---|---|---|---|---|
| 192.168.100.102 | PC20-2 | ADF | Color 24bit | A4 | 300dpi |

CD41, CD42, CD43, CD44, CD45, CD46, CD40

IMAGE FORMING APPARATUS AND IMAGE FORMING SYSTEM FOR SECURE TRANSMISSION OF IMAGE DATA

CROSS-REFERENCE TO RELATED APPLICATION

This application is a continuation of copending application Ser. No. 12/773,381, filed on May 4, 2010, the contents of which are incorporated herein by reference thereto.

BACKGROUND OF THE INVENTION

1. Field of the Invention

This invention relates to an image transmission apparatus having a function of transmitting image data.

2. Description of Related Art

A related art image transmission apparatus having a function of transmitting image data, for example, serves as a scanner, a multi-functional peripheral (hereafter referred to as MFP), a photocopier, or a facsimile device. Such a related art image transmission apparatus is accessed from a terminal such as a personal computer on a network by a method, for example, disclosed in Patent Document 1 listed below. Patent Document 1 discloses the method for preventing multiple accesses by connection of the scanner and the network through a server capable of not allowing the scanner to be accessed from a plurality of terminals at the same time. Accordingly, the multiple access prevention method allows a request from one terminal (also referred to as a first terminal) to be accepted at a time. In a case where a connection request is provided from another terminal (also referred to as a second terminal) in a state that the scanner is being connected to the first terminal, the multiple access prevention method does not allow the request from the second terminal to be accepted.

Patent Document 1: Japanese Unexamined Patent Application Publication No. 2000-112867

In a case where a connection to the related art image transmission apparatus is first attempted from a terminal to which the image data are not intended to be transmitted, however, the related image transmission apparatus has the likelihood of transmitting the image data to the wrong or unintended terminal. Consequently, the related art transmission may not be satisfactory in terms of technology.

This invention is proposed in consideration of the aforementioned situations, and provides an image transmission apparatus capable of transmitting image data to a destination to which the image data are intended to be transmitted, thereby reducing wrong transmission of the image data based on an image transmission request from an unintended requester.

BRIEF SUMMARY OF THE INVENTION

According to an aspect of this invention, an image transmission apparatus includes: an original document reading unit configured to read an original document, and produce image data; an operation unit configured to receive an input of a first password; a receiving unit configured to receive request information including a second password from an information processing apparatus; and a control unit configured to control the original document reading unit to read the original document based on the request information, and transmit the image data to an external device, the control unit restricting transmission of the image data to the external device if the first password does not correspond to the second password.

According to another aspect of this invention, an image transmission apparatus includes: an original document reading unit configured to read an original document and produce image data; an operation unit configured to receive an input of first identification information; a receiving unit configured to receive request information including second identification information from an information processing apparatus; and a control unit configured to switch modes of the image transmission apparatus between a first mode and a second mode, wherein the first mode allows the original document reading unit to read the original document based on the request information, and the second mode is different from the first mode, wherein the operation unit receives an instruction input to switch to the first mode, wherein the control unit switches the mode of the image transmission apparatus to the first mode when the operation unit receives the instruction input, wherein, if the mode of the image transmission apparatus is the first mode, the control unit controls the original document reading unit to read the original document based on image request information, and transmits the image data to the information processing apparatus, and wherein, if the first identification information does not correspond to the second identification information, the control unit restricts transmission of the image data to the information processing apparatus, and switches the mode of the image forming apparatus to the second mode.

According to other aspect of this invention, an image transmission system includes: an image transmission apparatus and an information processing apparatus, wherein the image transmission apparatus comprising: an original document reading unit configured to read an original document, and produce image data; an operation unit configured to receive an input of a first password; a receiving unit configured to receive request information including a second password from the information processing apparatus; and a control unit configured to control the original document reading unit to read the original document based on the request information, and transmit the image data to an external device, wherein the control unit restricts transmission of the image data to the external device if the first password does not correspond to the second password, and wherein the information processing apparatus transmits the request information including the second password to the image transmission apparatus.

Additional features and advantages of this invention will be more fully apparent from the following detailed description of embodiments, the accompanying drawings and the associated claims.

BRIEF DESCRIPTION OF THE DRAWINGS

A more complete appreciation of the aspects of this invention and many of the attendant advantage thereof will be readily obtained as the same becomes better understood by reference to the following detailed description when considered in connection with the accompanying drawings, wherein:

FIG. 3 is a circuit diagram illustrating a circuit relating to an original document placement sensor in the image reading unit of FIG. 2;

FIG. 9 is a schematic diagram illustrating an example of an image transmission request command to be received by a receiving unit in the image transmission apparatus of FIG. 1;

FIG. 16 is a schematic diagram illustrating an example of an image transmission request command to be received by a receiving unit in the image transmission apparatus of FIG. 14;

FIG. 20 is a schematic diagram illustrating an example of an image transmission request command transmitted from the personal computer;

DETAILED DESCRIPTION OF PREFERRED EMBODIMENTS

Figure 1:
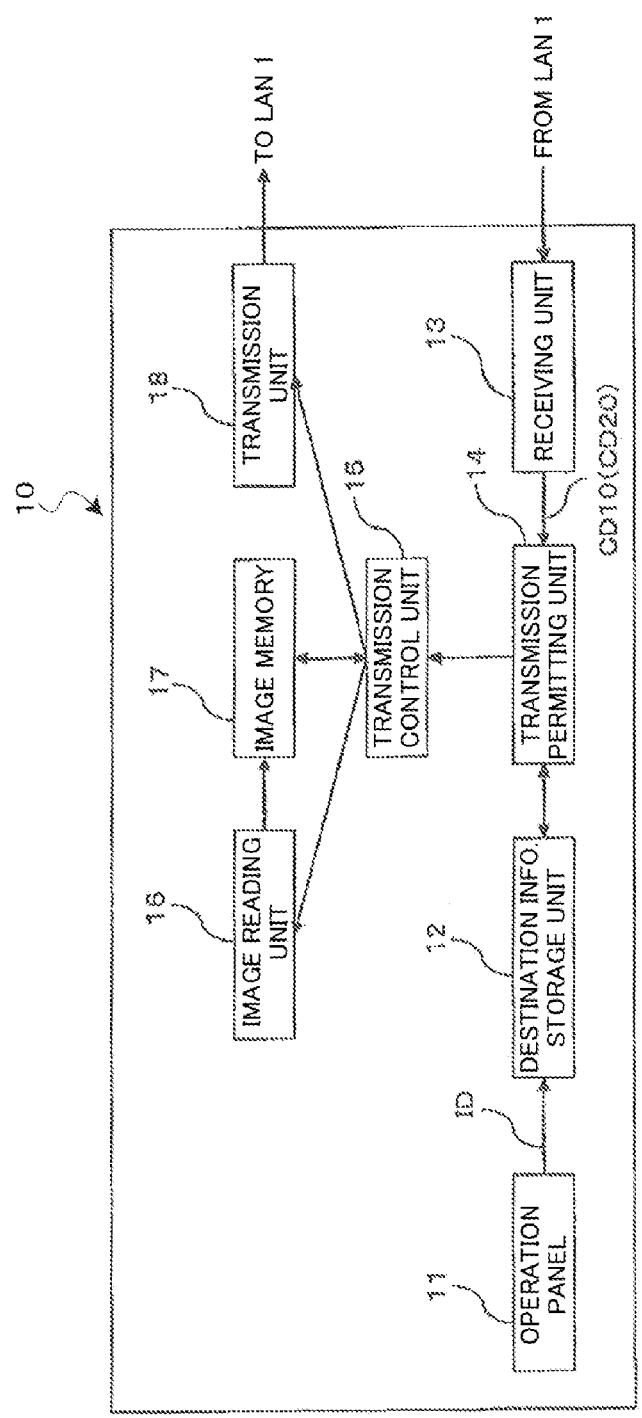
FIG. 1 is a schematic diagram illustrating an image transmission apparatus according to a first embodiment of this invention.

An image transmission apparatus according to preferred embodiments of this invention is now described more fully hereinafter with reference to the accompanying drawings. This invention may, however, be embodied in many different forms and should not be construed as limited to the embodiments set forth herein. The embodiments, therefore, may be modified or varied without departing from the scope of this invention.

In describing embodiments illustrated in the drawings, specific terminology is employed for the sake of clarity. However, the disclosure of the patent specification is not intended to be limited to the specific terminology so selected, and it is to be understood that each specific element includes all technical equivalents that operate in a similar manner. Preferred embodiments of this invention are described in detail referring to the drawings, wherein like reference numerals designate identical or corresponding parts throughout the several views.

First Embodiment

Figure 6:
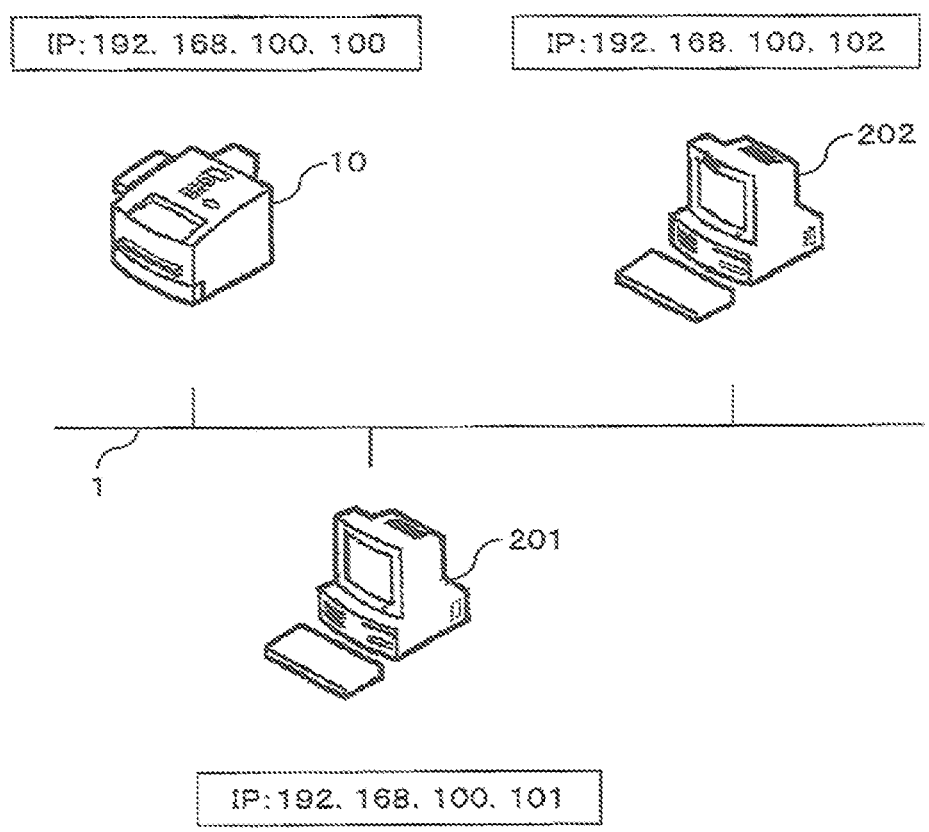
FIG. 6 is a schematic diagram illustrating an image transmission system according to the first embodiment of this invention.

Referring to FIG. 6, an image transmission system according to a first embodiment of this invention is illustrated in a schematic diagram.

The image transmission system includes a local area network (hereafter referred to as LAN) 1. The LAN 1 is connected with an image transmission apparatus 10 and a plurality of image processing apparatuses 201, 202 such as personal computers (may be abbreviated as PC as necessary). The LAN 1 is also connected with a terminal (not shown) such as a domain name system server (hereafter referred to as DNS server). For example, the image transmission apparatus 10 serves as a scanner, and has an Internet protocol address (hereafter referred to as IP address) "192.168.100.100." Each of the personal computers 201, 202 performs a programming process of image data based on the control by a central processing unit (hereafter referred to as CPU). For example, the personal computer 201 has the IP address "192.168.100.101" while the personal computer 202 has the IP address "192.168.100.102."

Referring to FIG. 1, the image transmission apparatus 10 shown in FIG. 6 is illustrated in a schematic diagram.

The image transmission apparatus 10 according to the first embodiment of this invention is, for example, the scanner employing a flat-bed method. The image transmission apparatus 10 includes: an identification data input unit (e.g., operation panel) 11 allowing identification data to be input thereto to set an image data destination to which the image data are transmitted; a destination information storage unit 12 storing therein the identification data of the image data destination set by the operation panel 11; a receiving unit 13 connected to the LAN 1; a transmission permitting unit 14; a transmission control unit 15; an image reading unit 16 reading the original document and outputting the image data; an image memory 17 storing therein the image data output from the image reading unit 16; and a transmission unit 18 connected to the LAN 1.

The receiving unit 13 receives transmission information (also referred to as transmission data) relating to an image data transmission request command transmitted through the LAN 1 from the personal computers 201, 202 serving as image transmission requesters, and outputs the image transmission request command (e.g., CD10 or CD20) among the transmission data received. The receiving unit 13 includes an output side connected with the transmission permitting unit 14, and the destination information storage unit 12 includes an output side connected with the transmission permitting unit 14. The identification data to be input to the operation panel 11 serving as the identification data input unit are unique information identifying, for example, the personal computers 201, 202 serving as the image transmission requesters.

The transmission permitting unit 14 determines whether to permit the transmission based on comparison between the identification data of the image data destination stored in the destination information storage unit 12 and the image transmission request command (e.g., CD10, CD20) output from the receiving unit 13. Where the identification data and the image transmission request command agree with each other, the transmission permitting unit 14 provides a transmission instruction. The transmission permitting unit 14 includes an output side connected with the transmission control unit 15. The transmission control unit 15 is connected with: the image reading unit 16; the image memory 17 storing the image data output from the image reading unit 16; and the transmission unit 18 transmitting the image data input to the LAN 1. The image reading unit 16 serves as an image input unit allowing the image data to be input therefrom. The image reading unit 16, for example, reads the original document and outputs the image data.

The transmission control unit 15 has functions of controlling the instruction with respect to the image reading unit 16 to read the image and the instruction with respect to the transmission unit 18 to transmit the image data by acquisition of the image data stored in the image memory 17 according to the instruction provided by the transmission permitting unit 14.

Figure 2:
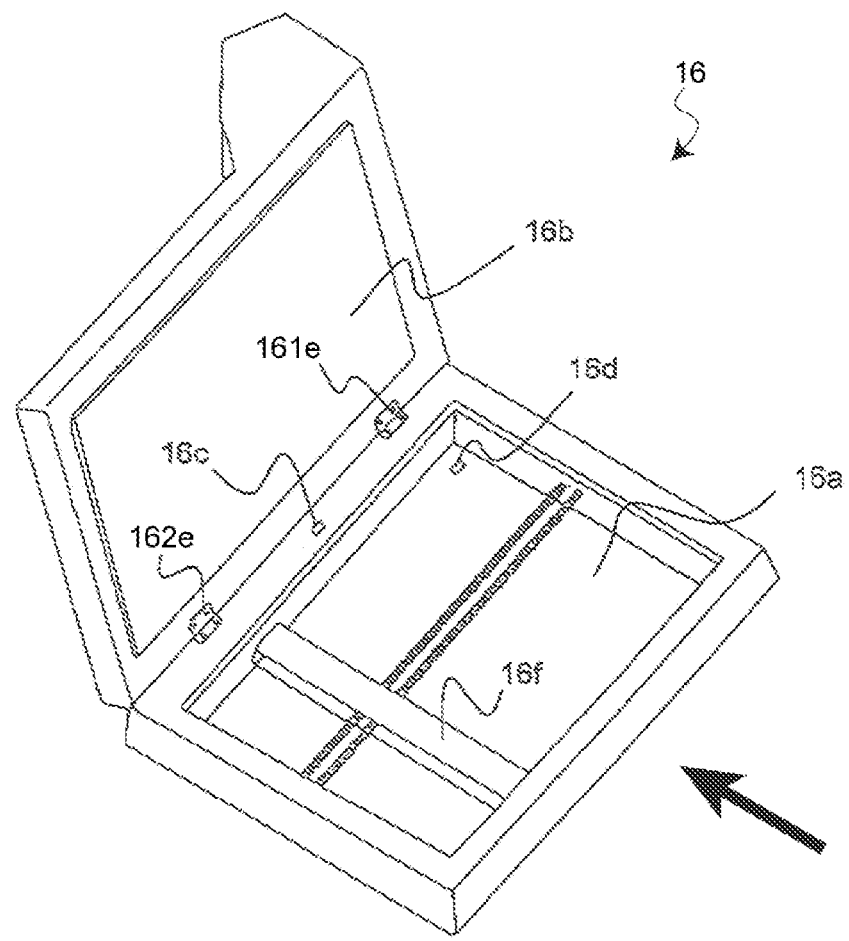
FIG. 2 is a perspective view illustrating an image reading unit in the image transmission apparatus of FIG. 1.

Referring to FIG. 2, the image reading unit 16 of FIG. 1 is illustrated in a perspective view.

The image reading unit 16 includes: an original document table 16*a* on which the original document to be read by the image reading unit 16 is placed; an original document pressing plate 16*b*, disposed in an openable and closable manner, covering the original document placed on the original document table 16*a*; a pressing plate open-close sensor 16*c* detecting the open and closed states of the original document pressing plate 16*b*; an original document placement sensor 16*d* detecting whether or not the original document is placed on the original document table 16*a*; a hinge mechanism 16*e*, including a first hinge 161*e* and a second hinge 162*e*, attaching the original document pressing plate 16*b* to the original document plate 16*a*; and an optical unit 16*f* reading the original document.

The original document pressing plate 16*b* is attached to an end portion of the original document table 16*a* in an openable and closable manner by the hinge mechanism 16*e*.

The pressing plate open-close sensor 16*c* is disposed in the end portion of the original document table 16*a* and in a middle portion between the first hinge 161*e* and the second hinge 162*e*. The pressing plate open-close sensor 16*c* determines whether or not the original document pressing plate 16*b* is closed based on the conduction of a mechanical sensor (not shown) such as a TACT switch (trademark). Herein, the mechanical sensor is pressed when the original document pressing plate 16*e* is closed, so that the mechanical sensor becomes electrically conductive.

The original document placement sensor 16*d* is disposed on an inner right side of the original document table 16*a*. Herein, the inner right side of the original document table 16*a* is found as seen from an arrow of FIG. 2. The original document placement sensor 16*d* allows a light emitting diode 42 (described later) and the like to emit illumination light, and allows a photodiode 43 (described later) and the like to detect the illumination light reflected by the original document or the original document pressing plate 16*b*, so that the original document placement sensor 16*d* detects whether the image [[readig]] reading unit 16 is in one of the following states: the original document pressing plate 16*b* is open; the original document is placed in such a manner as to contact the inner right side of the original document table 16*a*; and the original document is not placed in such a manner as to contact the inner right side of the original document table 16*a* while the original document pressing plate 16*b* is closed.

The optical unit 16*f* is vertically disposed inside the original document table 16*a*, and is moved by a drive unit (not shown) in a horizontal direction as seen from the arrow of FIG. 2. Accordingly, the optical unit 16*f* reads the original document placed on the original document table 16*a*.

Each of the pressing plate open-close sensor 16*c* and the original document placement sensor 16*d* includes an output side connected with an input side of the transmission control unit 15. The original document placement sensor 16*d* detects the presence or absence of the original document on the image reading unit 16, and serves as an image data change detection unit detecting a change of the image data relating to the original document.

Referring to FIG. 3, a circuit relating to the original document placement sensor 16*d* is illustrated in a circuit diagram.

The circuit relating to the original document placement sensor 16*d* includes: a transistor 41; the light emitting diode 42 driven by the transistor 41; the photodiode 43 detecting reflection of the illumination light emitted by the light emitting diode 42; an amplifier 44 amplifying an output signal detected by the photodiode 43; and a reflection light detector 45 detecting the output signal amplified by the amplifier 44.

An illumination light controller 40 outputs an output signal having a voltage of 5 V when detecting whether or not the original document is placed. The output signal allows the transistor 41 to turn ON, so that the light emitting diode 42 is driven and emits the illumination light. The original document or the original document pressing plate 16*b* reflects the illumination light emitted from the light emitting diode 42, and the photodiode 43 detects the reflection of the illumination light. Subsequently, the illumination light is amplified by the amplifier 44 and is input to the reflection light detector 45. The image reading unit 16 is, for example, in one of the following states: the original document is not placed while the original document pressing plate 16*b* is not detected; the original document is placed; and the original document pressing table 16*b* is detected. The states of the image reading unit 16 are distinguished from one another according to a voltage level of the signal input to the refection light detector 45.

Figure 4A:
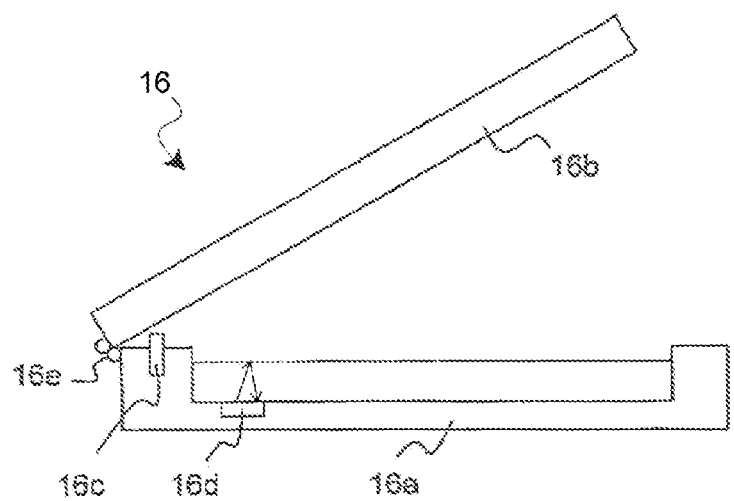
FIG. 4A and FIG. 4B are cross-sectional views illustrating a case where an original document is not placed on the image reading unit of FIG. 2.
Figure 4B:
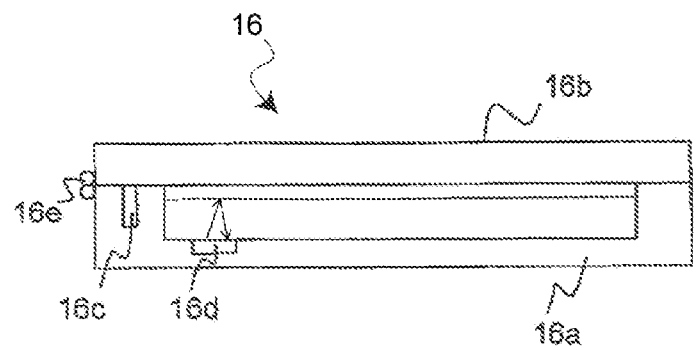

Referring to FIG. 4A and FIG. 4B, the image reading unit 16 of FIG. 2 in a case where the original document is not placed is illustrated in cross-sectional views.

In a case where the original document pressing plate 16*b* is open as illustrated in FIG. 4A, the pressing plate open-close sensor 16*c* is not being pressed by the original document pressing plate 16*b*, thereby being not conductive. Since the original document is not placed on the original document table 16*a*, and the original document pressing plate 16*b* is open, the photodiode 43 of the original document placement sensor 16*d* hardly detects the reflection light when the light emitting diode 42 of the original document placement sensor 16*d* emits the illumination light.

In a case where the original document pressing plate 16*b* is closed as illustrated in FIG. 4B, the pressing plate open-close sensor 16*c* is pressed by the original document pressing plate 16*b*, thereby becoming conductive. When the light emitting diode 42 of the original document placement sensor 16*d* emits the illumination light, the illumination light is reflected by a side surface of the original document placement sensor 16*d*, and the photodiode 43 of the original document placement sensor 16*d* detects the reflection light reflected by the side surface. Since the original document pressing plate 16*b* is made of a material having a property of providing a strong reflection light, the reflection light reflected by the side surface thereof can be distinguished from the reflection light reflected by the original document.

Figure 5A:
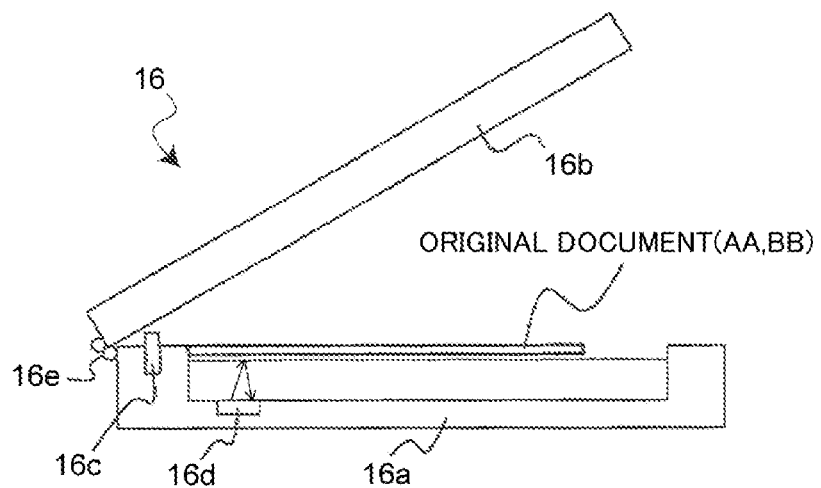
FIG. 5A and FIG. 5B are cross-sectional views illustrating a case where the original document is placed on the image reading unit of FIG. 2.
Figure 5B:
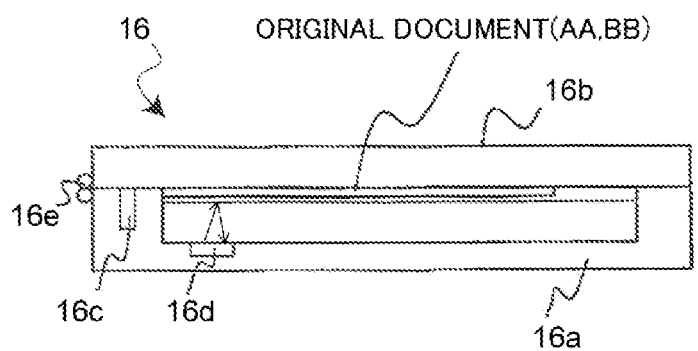

Referring to FIG. 5A and FIG. 5B, the image reading unit 16 of FIG. 2 in a case where the original document is placed is illustrated in cross-sectional views.

In a case where the original document pressing plate 16b is open as illustrated in FIG. 5A, the pressing plate open-close sensor 16c is not being pressed by the original document pressing plate 16b as similar to FIG. 4A, thereby being not conductive. Since the original document is placed on the original document table 16a, the photodiode 43 of the original document placement sensor 16d detects the reflection light reflected by the original document when the light emitting diode 42 of the original document placement sensor 16d emits the illumination light.

In a case where the original document pressing plate 16b is closed as illustrated in FIG. 5B, the pressing plate open-close sensor 16c is pressed by the original document pressing plate 16b as similar to FIG. 4B, thereby becoming conductive. Since the original document is placed on the original document table 16a, the photodiode 43 of the original document placement sensor 16d detects the reflection light reflected by the original document when the light emitting diode 42 of the original document placement sensor 16d emits the illumination light.

Figure 7:
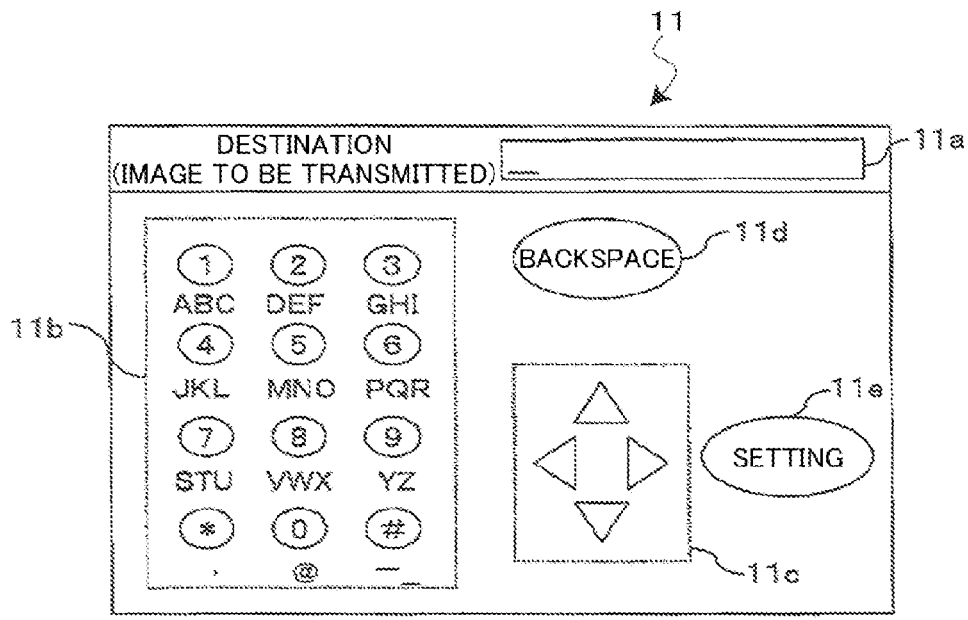
FIG. 7 is a schematic diagram illustrating an operation panel in the image transmission apparatus of FIG. 1.

Referring to FIG. 7, the operation panel 11 of FIG. 1 is illustrated in a schematic diagram.

The operation panel 11, for example, includes: a display unit 11a displaying thereon the image data destination which is input by a user; an input key 11b for the input of the destination; a cursor key 11c; a backspace key 11d; and a setting key 11e.

The display unit 11a displays thereon, for example, an IP address of the destination, a domain name of the terminal of the destination registered in the DNS server. A character string is input using the input key 11b and displayed on the display unit 11a. The cursor key 11c is used to move a cursor displayed on the display unit 11a. The backspace key 11d can be used to delete a characters or characters displayed on the display unit 11a. The setting key 11e is used to confirm the destination displayed on the display unit 11a.

Figure 8:
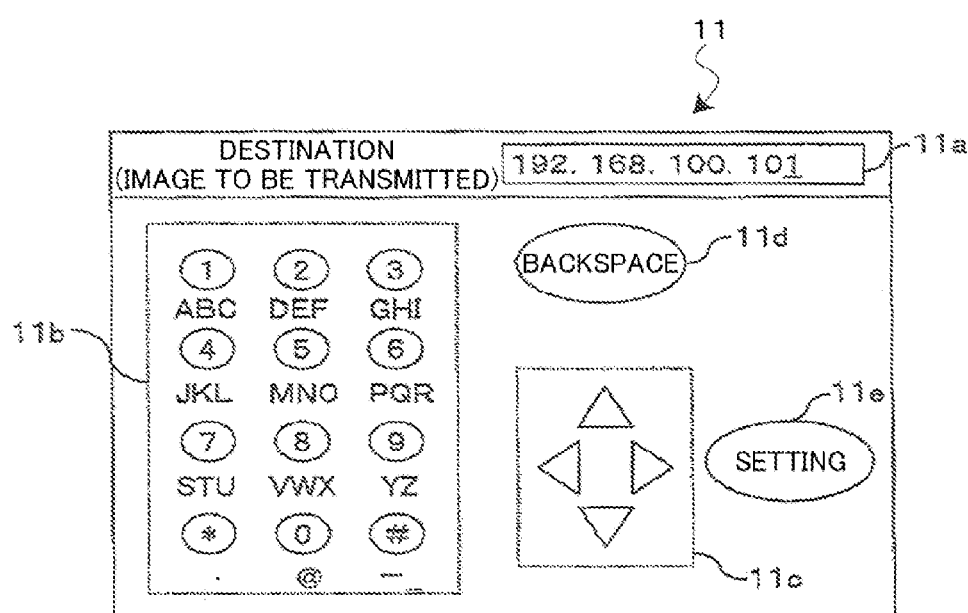
FIG. 8 is a schematic diagram illustrating an input example of the operation panel of FIG. 7.

Referring to FIG. 8, an input example of the operation panel 11 of FIG. 7 is illustrated. For example, in a case where the IP address "192.168.100.101" of the personal computer 201 is input as the image data destination, the display unit 11a displays thereon "192.168.100.101" as illustrated in FIG. 8.

Referring to FIG. 9, an example of the image transmission request command CD10 to be received by the receiving unit 13 in the image transmission apparatus 10 of FIG. 1 is illustrated. For example, the image transmission request command CD10 includes: a destination data CD11; a scan mode data CD12; a color mode data CD13; an original document size data CD14; and a resolution data CD15.

The destination data CD11, for example, represents destination information indicating the destination of the image data. Herein, the destination information, is for example, the IP address "192.168.100.101." The scan mode data CD12 represents information indicating a location of the original document to be read, or namely a reading location. For example, an auto document feeder (hereafter referred to as ADF) is designated as the reading location in FIG. 9. In addition to the ADF, a flat bed and the like can be designated as the reading location. The color mode data CD13 represents color information of the image data to be generated by reading the original document. For example, the image data having the 24 bits color are designated in FIG. 9. The original document size data CD14 represents the size of the original document to be read by the image transmission apparatus 10. For example, the size standard A4 is designated as the original document size in FIG. 9. In a case where the size of the original document is automatically detected, "automatic" can be designated. The resolution data CD15 represents the resolution used to read the original document. For example, the resolution of 300 dpi is designated in FIG. 9.

A description is now given of example operation of the image transmission system according to the first embodiment of this invention. Particularly, the description is given by comparison of a related art example case in which first and second original documents are set in a related art image transmission apparatus at different timings by a first user using a first personal computer and a second user using a second personal computer respectively, and an example case in which the original documents AA, BB are set in the image transmission apparatus 10 by a user A using the personal computer 201 and a user B using the personal computer 202 respectively in the image transmission system of FIG. 6 according to the first embodiment of this invention.

Assuming that the first user using the first personal computer goes to the related art image transmission apparatus to set the first original document and returns to the first personal computer at a timing T1. The first user attempts to activate reading operation of the related image transmission apparatus using an application on the first personal computer at a timing T2. Assuming that the second user using the second personal computer removes the first original document set by the first user from the related art image transmission apparatus, and places the second original document to make a copy between the timings T1 and T2. In such a case, the second original document is read when the first user activates the reading operation at the timing T2.

According to the first embodiment, on the other hand, when the user A goes to the image transmission apparatus 10 to set the original document AA, and the destination of the image data to be scanned is set (e.g., FIG. 8), the reading operation is allowed only where the destination is included in reading operation activation information (e.g., FIG. 9) provided from the personal computers 201, 202.

A description is now given of the operation of the image transmission apparatus 10. Herein, the description is given by comparison of a related art example case and an example case of the first embodiment of this invention.

When the image data read by the related art image transmission apparatus are transmitted to the first or second personal computer, the user sets the original document in the related art image transmission apparatus, and then uses the related art image transmission apparatus to designate the destination of the image data to be transmitted. The reading operation of the image data is performed by a related art image reading method.

According to the first embodiment of this invention, on the other hand, the user uses the application programs on the personal computers 201, 202 being familiar thereto to designate the destination of the image data after setting the original document in the image transmission apparatus 10, so that the reading operation is performed. Since the personal computers 201, 202 familiar to the user can be used, the image reading method according to the first embodiment can be preferred over the related art image reading method in a case where the user prefers a specific reading method, for example, in need of specific designation. The operation of the image transmission apparatus 10 is described in detail below.

Figure 10:
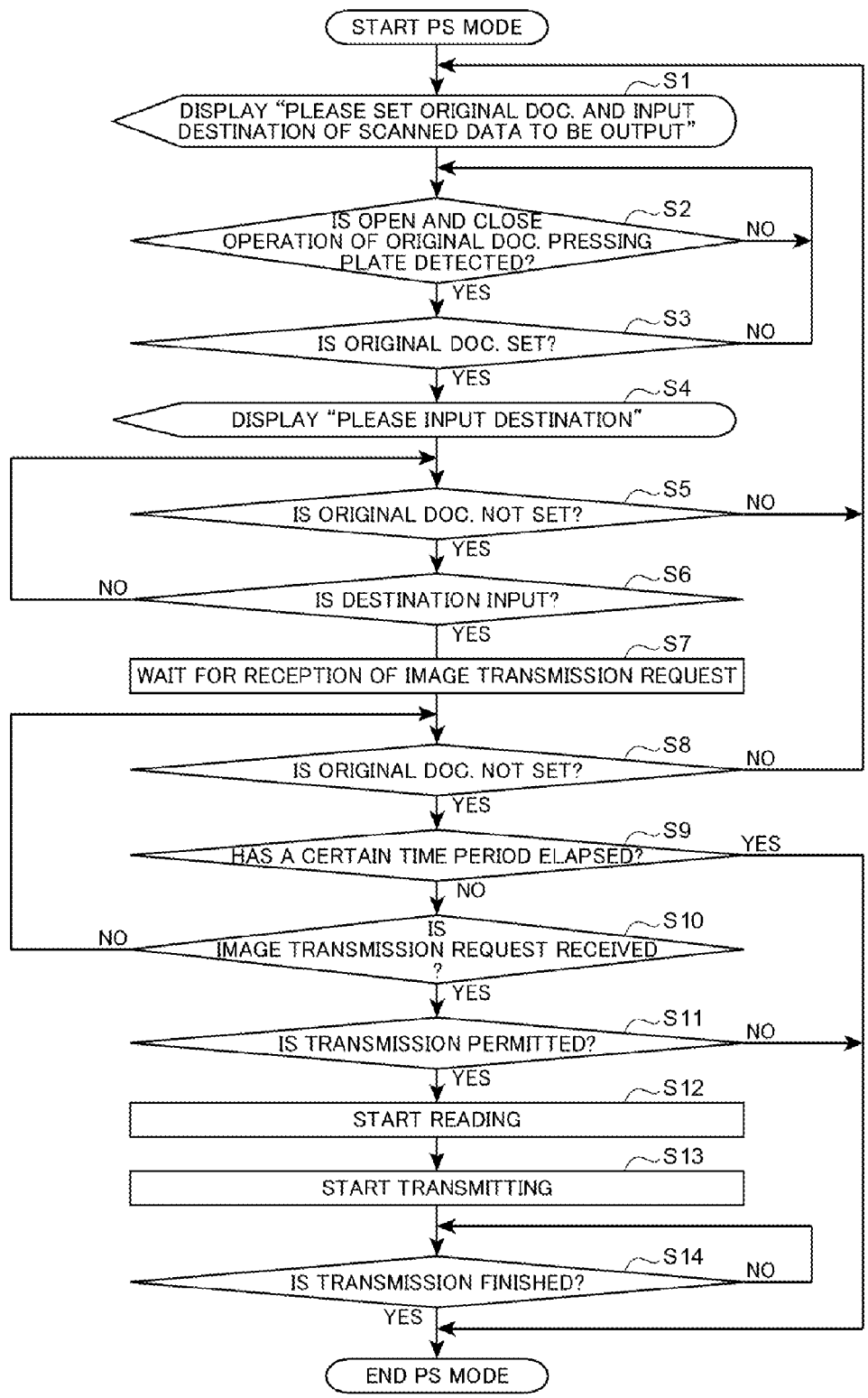
FIG. 10 is a flowchart illustrating an example operating procedure of the image transmission apparatus of FIG. 1.

Referring to a flowchart of FIG. 10, an example operating procedure of the image transmission apparatus 10 is illustrated.

The image transmission apparatus 10 enters into a personal scan mode (hereafter referred to as PS mode) when a plurality of prescribed keys on the operation panel 11 are pressed for a prescribed time period, for example, when the pound sign (#) key and the asterisk (*) key are simultaneously pressed for greater than or equal to 5 seconds. The PS mode represents a mode used in a case of transmitting the image data to the destination from the image transmission apparatus 10.

When a process of the PS mode in the flowchart shown in FIG. 10 is started, the image transmission apparatus 10 allows the display unit 11a to display "PLEASE SET ORIGINAL DOCUMENT AND INPUT DESTINATION OF SCANNED DATA TO BE OUTPUT" thereon (step S1). The image transmission apparatus 10 allows the pressing plate open-close sensor 16c to detect the open and close operation of the original document pressing plate 16b (step S2). Where the open and close operation of the original document pressing plate 16b is detected (Yes in step S2), and where the original document is detected by the original document placement sensor 16d as being set on the image reading unit 16 (step S3), the image transmission apparatus 10 allows the display unit 11a to display "PLEASE INPUT DESTINATION" thereon (step S4). The process of steps S2, S3 detects the open and close operation of the original document pressing plate 16b, that is, the user opens the original document pressing plate 16b to set the original document on the original document table 16a of the image reading unit 16 and closes the original document pressing plate 16b. Where the open and close operation of the original document pressing plate 16b is not detected by the pressing plate open-close sensor 16c (No in step S2), or where the original document is not detected by the original document placement sensor 16d as being set on the original document table 16a on the image reading unit 16 (No in step S3), the flow returns to step S2.

After allowing the display unit 11a to display "PLEASE INPUT DESTINATION" thereon (step S4), the image transmission apparatus 10 determines whether or not the original document placement sensor 16d detects that the original document is not set on the original document table 16a of the image reading unit 16 (step S5). Where the original document is not set (No in step S5), the flow returns to step S1. Where the original document is set (Yes in step S5), on the other hand, the image transmission apparatus 10 determines whether or not the destination (e.g., identification data) is input in the operation panel 11, and whether or not the setting key 11e is pressed (step S6). Where the conditions of step 6 are not satisfied, the flow returns to step 5.

Herein, the operation of the image transmission apparatus 10 is described using an example case where the user transmits the image data to the personal computer 201. The image transmission apparatus 10 detects the input of the IP address "192.168.100.101" of the personal computer 201 in the operation panel 11. Herein, the display unit 11a on the display panel 11 is displaying "192.168.100.101" as illustrated in FIG. 8. When the user removes the original document from the image reading unit 16, the image transmission apparatus 10 detects that the original document is not set on the original document table 16a of the image reading unit 16 by the original document placement sensor 16d, and the flow returns to step S1. The display unit 11a is again allowed to display "PLEASE SET ORIGINAL DOCUMENT AND INPUT DESTINATION OF SCANNED DATA TO BE OUTPUT" thereon (step S1). Where the user presses the setting key 11e, that is, the conditions of step 6 are satisfied, flow proceeds to step S7.

Where the destination is determined as being input in step S6, the receiving unit 13 of the image transmission apparatus 10 becomes in a reception waiting state of the image transmission request command CD10 as illustrated in FIG. 9 (step S7). The image transmission apparatus 10 determines by the original document placement sensor 16d whether or not the original document is not set on the original document table 16a of the image reading unit 16 (step S8). Where the original document is not set (No in step S8), the flow returns to step S1. After the destination is input, the image transmission apparatus 10 determines whether a certain time period has elapsed without receiving the image transmission request command CD10 (step S9). Where the certain time period has elapsed (Yes in step S9), the flow of FIG. 10 is finished, thereby ending the PS mode and returning to a normal mode. Where the certain time period has not elapsed (No in step S9), on the other hand, the image transmission apparatus 10 determines whether or not the receiving unit 13 has received the image transmission request command CD10 as illustrated in FIG. 9 through the LAN 1 (step S10). Where the image transmission request command CD 10 is not received (No in step S10), the flow returns to step S8.

Where the image transmission request command CD10 is received (Yes in step S10), on the other hand, the image transmission apparatus 10 transmits the received image transmission request command CD 10 with respect to the transmission permitting unit 14. The transmission permitting unit 14 determines whether or not the information of the destination (e.g., identification data) input in the operation panel 11 and the destination information (e.g., the destination data CD11 of FIG. 9) included in the image transmission request command CD10 received by the receiving unit 13 agree with each other (step S11). Where the information of the destination (e.g., identification data) input in the operation panel 11 and the destination information (e.g., the destination data CD11 of FIG. 9) included in the image transmission request command CD10 agree to each other (Yes in step S11), the transmission permitting unit 14 permits the transmission control unit 15 the transmission of the image data. Where the information of the destination (e.g., identification data) and the destination information (e.g., the destination data CD11 of FIG. 9) do not agree with each other (No in step S11), on the other hand, the flow of FIG. 10 is finished, thereby ending the PS mode and returning to a normal mode.

When the transmission of the image data is permitted by the transmission permitting unit 14, the transmission control unit 15 instructs with respect to the image reading unit 16 to start reading the original document (step S12). The transmission control unit 15 instructs with respect to the transmission unit 18 to transmit the image data to the destination address set in the operation panel 11 (step S13). The image transmission apparatus 10 is on standby until the transmission of the image data is finished (step S14). Where the transmission is finished (Yes in step S14), the flow of FIG. 10 is finished, thereby ending the PS mode and returning to a normal mode.

Figure 11:
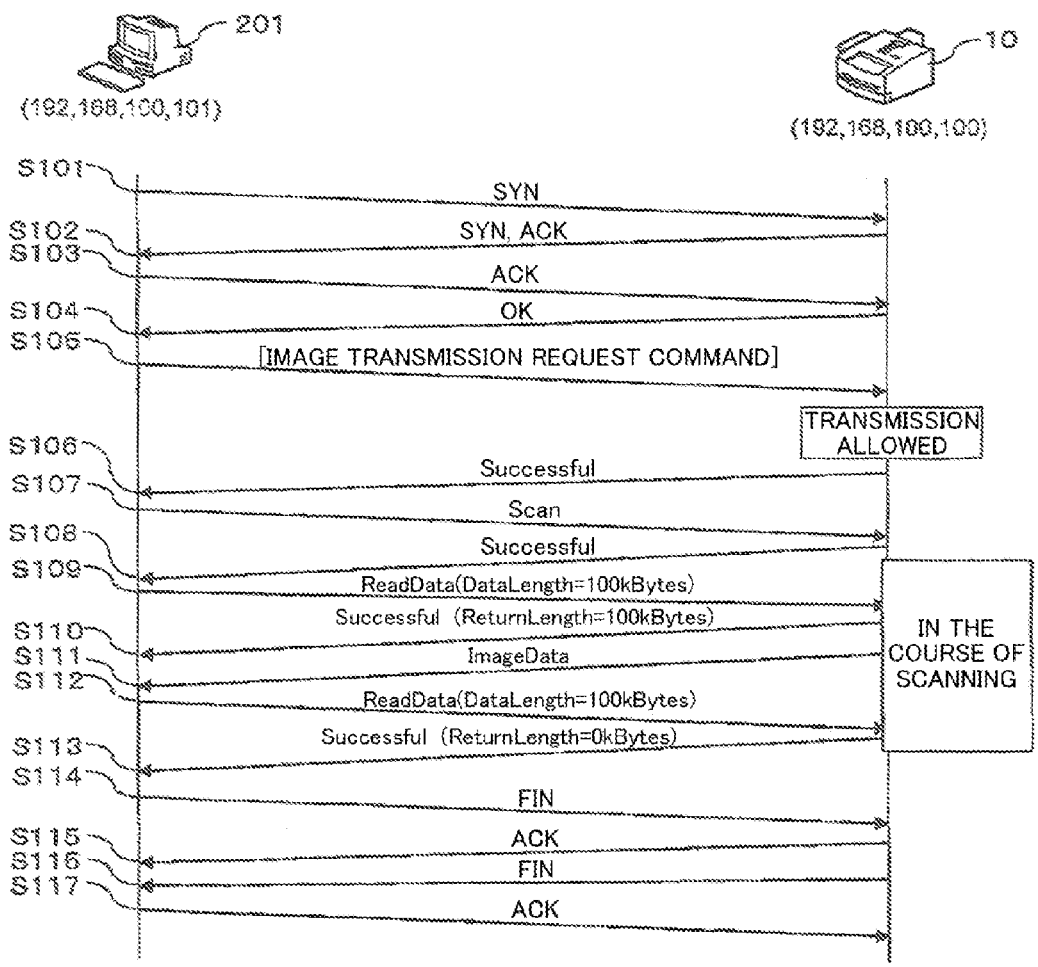
FIG. 11 is a schematic diagram illustrating a communication procedure in a case where transmission is permitted by a transmission permitting unit in the image transmission apparatus of FIG. 1.

Referring to FIG. 11, a description is given of an example communication procedure in a case where the transmission permitting unit 14 shown in FIG. 1 permits the transmission according to the first embodiment. Particularly, the description is given using an example procedure of communications between the image transmission apparatus 10 shown in FIG. 1 and the personal computer 201 when the image data are transmitted to the personal computer 201 in a normal manner based on the image transmission request command CD10 from the personal computer 201 in an attempt to transmit the image data to the personal computer 201 by the image transmission apparatus 10.

According to the first embodiment, a transmission control protocol (hereafter referred to as TCP) packet including a TWAIN (Technology Without An Interesting Name) command is used in a payload as a command between the image transmission apparatus 10 and the personal computer 201. Since the image transmission request command CD10 is not included in the TWAIN command, the command as illustrated in FIG. 9 is used.

The communications between the image transmission apparatus 10 and the personal computer 201 are started in step S7 in the flowchart of FIG. 9. In the example communication procedure as illustrated in FIG. 11, when the personal computer 201 starts the communications with the image transmission apparatus 10, a synchronize (hereafter referred to as SYN) command is transmitted from the personal computer 201 with respect to the image transmission apparatus 10 (step S101). The image transmission apparatus 10 receives the SYN command from the personal computer 201, and transmits a synchronize and acknowledge (SYN and ACK) command (step S102). Upon receiving the SYN and ACK command from the image transmission apparatus 10, the personal computer 201 transmits an acknowledge (ACK) command with respect to the image transmission apparatus 10 (step S103). Upon receiving the ACK command from the personal computer 201, the image transmission apparatus 10 returns an okay response (hereafter referred to as OK) to the personal computer 201 (step S104). At this point, a TCP connection is established between the image transmission apparatus 10 and the personal computer 201.

When the TCP connection is established between the image transmission apparatus 10 and the personal computer 201, the personal computer 201 transmits the image transmission request command CD10 as illustrated in FIG. 9 to the image transmission apparatus 10 (step S105). Where the destination (e.g., identification data) of the image input in the operation panel 11 of the image transmission apparatus 10 and the destination data CD 11 included in the image transmission request command CD10 agree with each other, the image transmission apparatus 10 transmits a Successful command including the TWAIN command in the payload in the TCP to the personal computer 201 (step S106). Since the image transmission request command CD10 is accepted, the personal computer 201 transmits a Scan command including the TWAIN command in the payload in the TCP to the image transmission apparatus 10 (step S107). Upon receiving the Scan command from the personal computer 201, the image transmission apparatus 10 starts reading the original document, and transmits the Successful command including the TWAIN command in the payload in the TCP to the personal computer 201 (step S108).

Subsequently, the personal computer 201 transmits a ReadData command including the TWAIN command in the payload in the TCP to the image transmission apparatus 10 to read the image data from the image transmission apparatus 10 (step S109). Herein, the data having 100 kilo bytes are requested to be read in FIG. 11. The image transmission apparatus 10 transmits a readable image data size to the personal computer 201 with the Successful command (step S110), and transmits the image data ("ImageData") which are read to the personal computer 201 (step S111). The personal computer 201 transmits the ReadData command of the image and continues to read the image data.

In a case where no readable image data remains, the personal computer 201 transmits the ReadData command to the image transmission apparatus 10 (step S112), and is notified of zero (0) as the size of the image data read from the image transmission apparatus 10 (step S113). Accordingly, the personal computer 201 finishes the image reading.

The personal computer 201 cuts the TCP connection established with the image transmission apparatus 10 towards the end of the procedure in FIG. 11. The personal computer 201 transmits a finish (FIN) command to the image transmission apparatus 10 (step S114). The image transmission apparatus 10 transmits the ACK command with respect to the personal computer 201 (step S115), and then transmits the FIN command with respect to the personal computer 201 (step S116). Upon receiving the FIN command from the image transmission apparatus 10, the personal computer 201 transmits the ACK command to the image transmission apparatus 10, and the cutting of the TCP connection is competed (step S117).

A description is given of an example communication procedure in a case where the transmission permitting unit 14 rejects the transmission according to the first embodiment. The description is given using an example command as illustrated in FIG. 12 and an example communication procedure between the image transmission apparatus 10 and the personal computer 202 as illustrated in FIG. 13.

Figure 12:
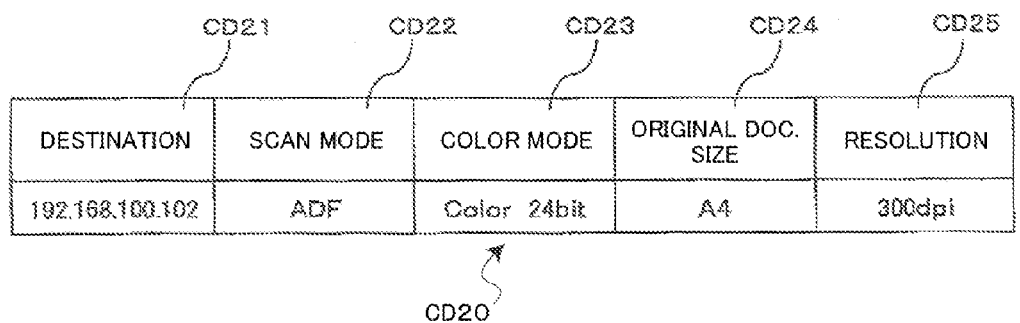
FIG. 12 is a schematic diagram illustrating an example of an image transmission request command to be transmitted from a personal computer.

The image transmission request command CD20, serving as the example command, to be transmitted from the personal computer 202 is illustrated in FIG. 12. The image transmission request command CD20 includes a destination data CD21, a scan mode data CD22, a color mode data CD23, an original document size data CD24, and a resolution data CD25 as similar to the image transmission request command CD10 of FIG. 9 except for the destination data CD21. The destination data CD21 has an IP address "192.168.100.102" of the personal computer 202.

Figure 13:
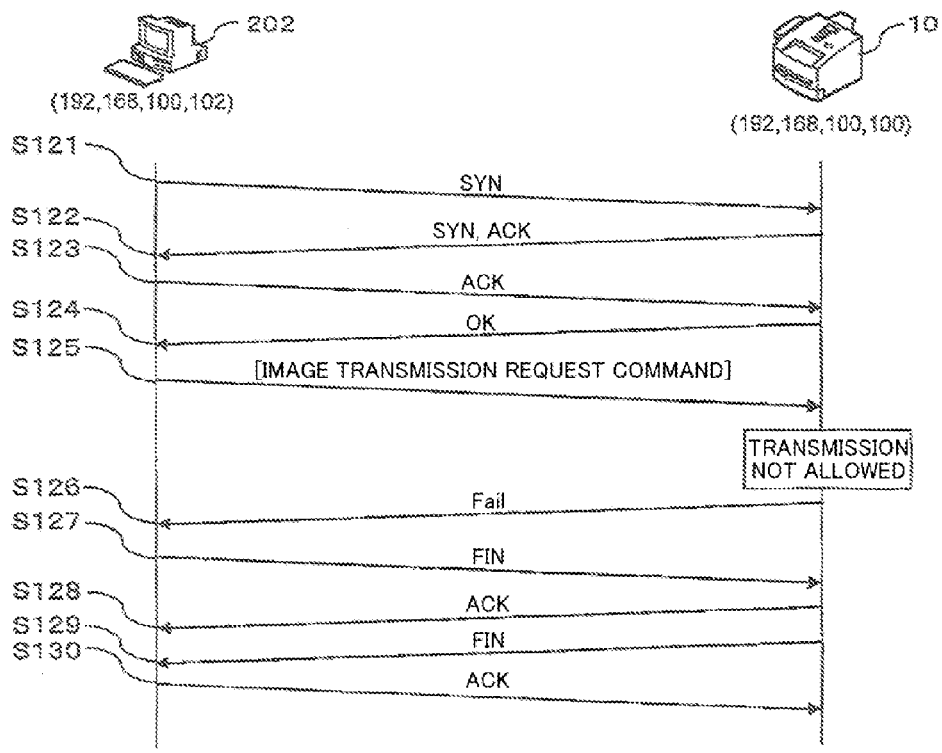
FIG. 13 is a schematic diagram illustrating a communication procedure in a case where the transmission is rejected by the transmission permitting unit in the image transmission apparatus of FIG. 1.

The example communication procedure in a case where the transmission permitting unit 14 rejects the transmission is illustrated in FIG. 13.

With reference to FIGS. 12, 13, the example communication procedure is described of the communications between the image transmission apparatus 10 and the personal computer 202 when the image transmission apparatus 10 receives the image transmission request command CD20 from the personal computer 202 after the transmission of the image data to the personal computer 201 is set in the image transmission apparatus 10.

When the personal computer 202 starts the communications with the image transmission apparatus 10, the SYN command is transmitted from the personal computer 202 to the image transmission apparatus 10 (step S121). The image transmission apparatus 10 receives the SYN command from the personal computer 202 and then transmits the SYN and ACK command to the personal computer 202 (step S122). Upon receiving the SYN and ACK command from the image transmission apparatus 10, the personal computer 202 transmits the ACK command with respect to the image transmission apparatus 10 (step S123). Upon receiving the ACK command from the personal computer 202, the image transmission apparatus 10 returns the OK to the personal computer 202 (step S124). At this point, the TCP connection is established between the image transmission apparatus 10 and the personal computer 202.

When the TCP connection is established between the image transmission apparatus 10 and the personal computer 202, the personal computer 202 transmits the image transmission request command CD20 as illustrated in FIG. 12 to the image transmission apparatus 10 (step S125). The image transmission request command CD20 of FIG. 12 has the destination data CD21 including the IP address "192.168.100.102" of the personal computer 202. The destination "192.168.100.101" input in the operation panel 11 of the image transmission apparatus 10 and the destination data CD21 "192.168.100.102" included in the image transmission request command CD20 do not agree with each other. Accordingly, the image transmission apparatus 10 returns a Fail command including the TWAIN command in the payload in the TCP to the personal computer 202 to inform the rejection of the image data reading (step S126).

Subsequently, the personal computer 202 cuts the TCP connection established with the image transmission apparatus 10 towards the end of the procedure in FIG. 13. The personal computer 202 transmits the FIN command to the image transmission apparatus 10 (step S127). The image transmission apparatus 10 transmits the ACK command with respect to the personal computer 202 (step S128), and then transmits the FIN command with respect to the personal computer 202 (step S129). Upon receiving the FIN command from the image transmission apparatus 10, the personal computer 202 transmits the ACK command to the image transmission apparatus 10, and the cutting of the TCP connection is competed (step S130).

According to the image transmission apparatus 10 of the first embodiment, therefore, the identification data (e.g., IP address) of the destination input in the operation panel 11 and the destinations data CD11, CD12 (e.g., IP addresses) of the respective image transmission request commands CD10, CD20 are compared, and the image data are transmitted to the destination where the identification data and the destination agree with each other. Therefore, the image transmission apparatus 10 can transmit the image data to the destination intended to be the destination of the image data, thereby reducing the wrong transmission of the image based on the requests from the unintended personal computer 201 or 202.

According to the image transmission apparatus 10 of the first embodiment, moreover, the identification data are allowed to be input, and the transmission of the image data is permitted while determining whether or not the original document to be scanned is set on the original document table 16a of the image reading unit 16. The original document to be scanned can be allowed to correspond to the identification data. Accordingly, in a case where another user replaces the original document on the original document table 16a with another original document in a time between the input of the identification data and the request provided from the personal computers 201, 202, the image transmission apparatus 10 according to the first embodiment can reduce occurrences of transmitting the unintended image data relating to the replaced original document.

A description is now given of modification of the first embodiment.

The image transmission apparatus 10 uses the IP address of the destination to determine whether or not to transmit the image data according to the first embodiment. However, information known only by the user attempting to transmit the data can be included in each of the image transmission request commands CD10, CD20. The information is, for example, a password or a setting value such as a domain name or a media access control address (hereafter referred to as MAC address) necessary for the connection to the network. The modification of the first embodiment can provide an advantage similar to that provided according to the first embodiment.

Second Embodiment

An image transmission system according to a second embodiment is similar to that according to the first embodiment illustrated in FIG. 6 except for an image transmission apparatus 10A.

Figure 14:
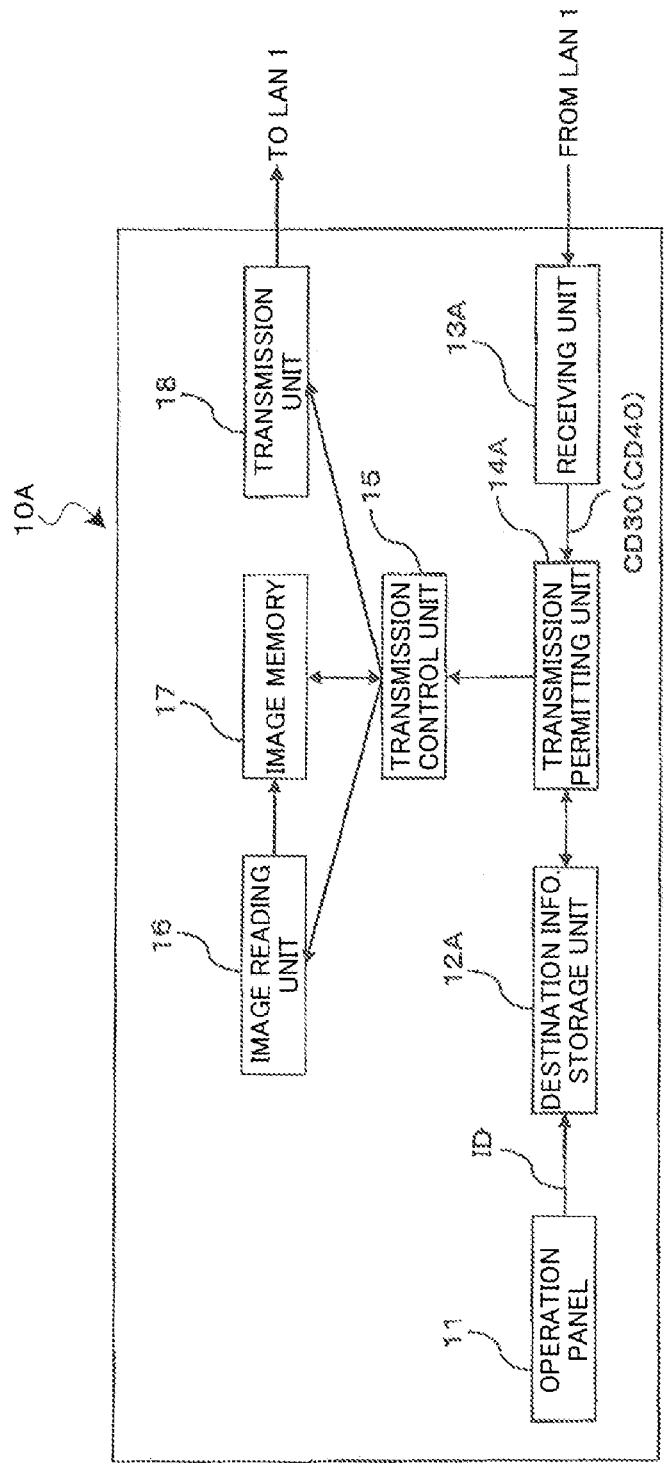
FIG. 14 is a schematic diagram illustrating an image transmission apparatus according to a second embodiment of this invention.

Referring to FIG. 14, the image transmission apparatus 10A according to the second embodiment of this invention is illustrated. Components similar to that illustrated in FIG. 1 of the first embodiment will be given the same reference numerals.

The image transmission apparatus 10A of the second embodiment, for example, serves as a scanner employing a flat-bed method as similar to the first embodiment. The image transmission apparatus 10A includes: an operation panel 11; a destination information storage unit 12A; a receiving unit 13A; a transmission permitting unit 14A; a transmission control unit 15; an image reading unit 16; an image memory 17; and a transmission unit 18. The operation panel 11, the transmission control unit 15, the image reading unit 16, the image memory 17, and the transmission unit 18 function similar to those described above in the first embodiment. The destination information storage unit 12A, the receiving unit 13A, and the transmission permitting unit 14A of the second embodiment function different from the destination information storage unit 12, the receiving unit 13, and the transmission permitting unit 14 of the first embodiment.

The operation panel 11, serving as an identification data input unit, is used to set identification data (e.g., password) for permission of the image data transmission. The operation panel 11 includes an output side connected with the destination information storage unit 12A. The destination information storage unit 12A, serving as a storage region, stores therein the identification data (e.g., password) set in the operation panel 11, and includes an output side connected with the receiving unit 13A through the transmission permitting unit 14A. The receiving unit 13A receives data transmitted through LAN 1 from personal computers 201, 202 serving as image transmission requesters, and outputs an image transmission request command CD30 among the transmission data received to the transmission permitting unit 14A.

The transmission permitting unit 14A compares the identification data (e.g., password) stored in the destination information storage unit 12A with the image transmission request command CD30 received by the receiving unit 13A. Where the identification data and the image transmission request command CD30 agree with each other, the transmission permitting unit 14A provides a transmission instruction to the transmission control unit 15. As similar to the first embodiment, the transmission control unit 15 is connected with the image reading unit 16, the image memory 17, and the transmission unit 18.

Figure 15:
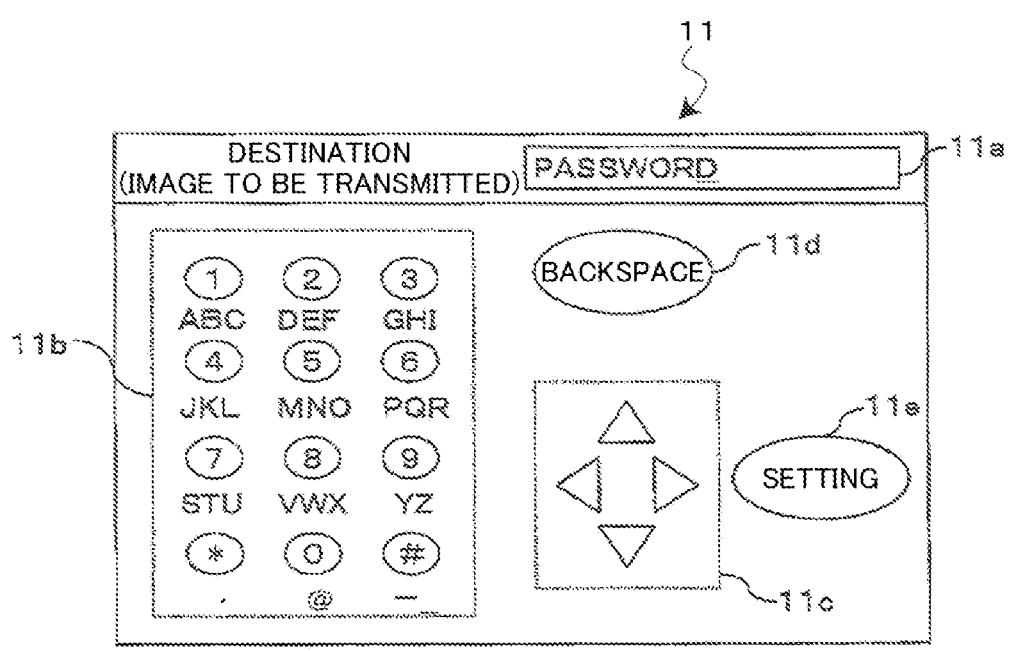
FIG. 15 is a schematic diagram illustrating an input example of an operation panel in the image transmission apparatus of FIG. 14.

Referring to FIG. 15, an input example of the operation panel 11 of FIG. 14 is illustrated. As similar to the first embodiment, the operation panel 11, for example, includes: a display unit 11a displaying thereon the image data destination which is input by a user; an input key 11b for an input of the destination; a cursor key 11c; a backspace key 11d; and a setting key 11e. When the user inputs the identification data (e.g., "PASSWORD" serving as the password) using the input key 11b to allow the transmission of the image data, the "PASSWORD" is stored in the transmission information storage unit 12A and is displayed on the display unit 11a as illustrated in FIG. 15.

Referring to FIG. 16, an example of the image transmission request command CD30 to be received by the receiving unit 13 in the image transmission apparatus 10A of FIG. 14 is illustrated. The image transmission request command CD30 is similar to the image transmission request command CD10 of FIG. 9.

For example, the image transmission request command CD30 of the second embodiment includes a destination data CD31, a scan mode data CD33, a color mode data CD34, an original document size data CD35, and a resolution data CD36 as similar to the image transmission request command CD10 including the destination data CD11, the scan mode data CD12, the color mode data CD13, the original document size CD14, and the resolution data CD15 described above in the first embodiment. The image transmission request command CD30 according to the second embodiment also includes an identification data CD32.

The identification data CD32 include the identification data (e.g., "PASSWORD") for obtaining the image transmission permission with respect to the image transmission apparatus 10A. The destination data CD31 includes the IP address "192.168.100.102" of the personal computer 202 serving as the destination of the image data.

A description is now given of example operation of the image transmission system according to the second embodiment.

For example, in a case where original documents AA, BB are set at different times in the image transmission apparatus 10A by a user A using the personal computer 201 and a user B using the personal computer 202 respectively in the image transmission system as similar to the first embodiment as illustrated in FIG. 6, the example operation of the image transmission system according to the second embodiment differs from that of the first embodiment as follows.

According to the second embodiment, when the user A goes to the image transmission apparatus 10A to set the original document AA, the user sets a prescribed password (e.g., FIG. 15) with respect to scanned image data, so that the image transmission apparatus 10A allows the reading operation only where the prescribed password (e.g., FIG. 16) is included in reading operation activation information from the personal computers 201, 202.

Figure 17:
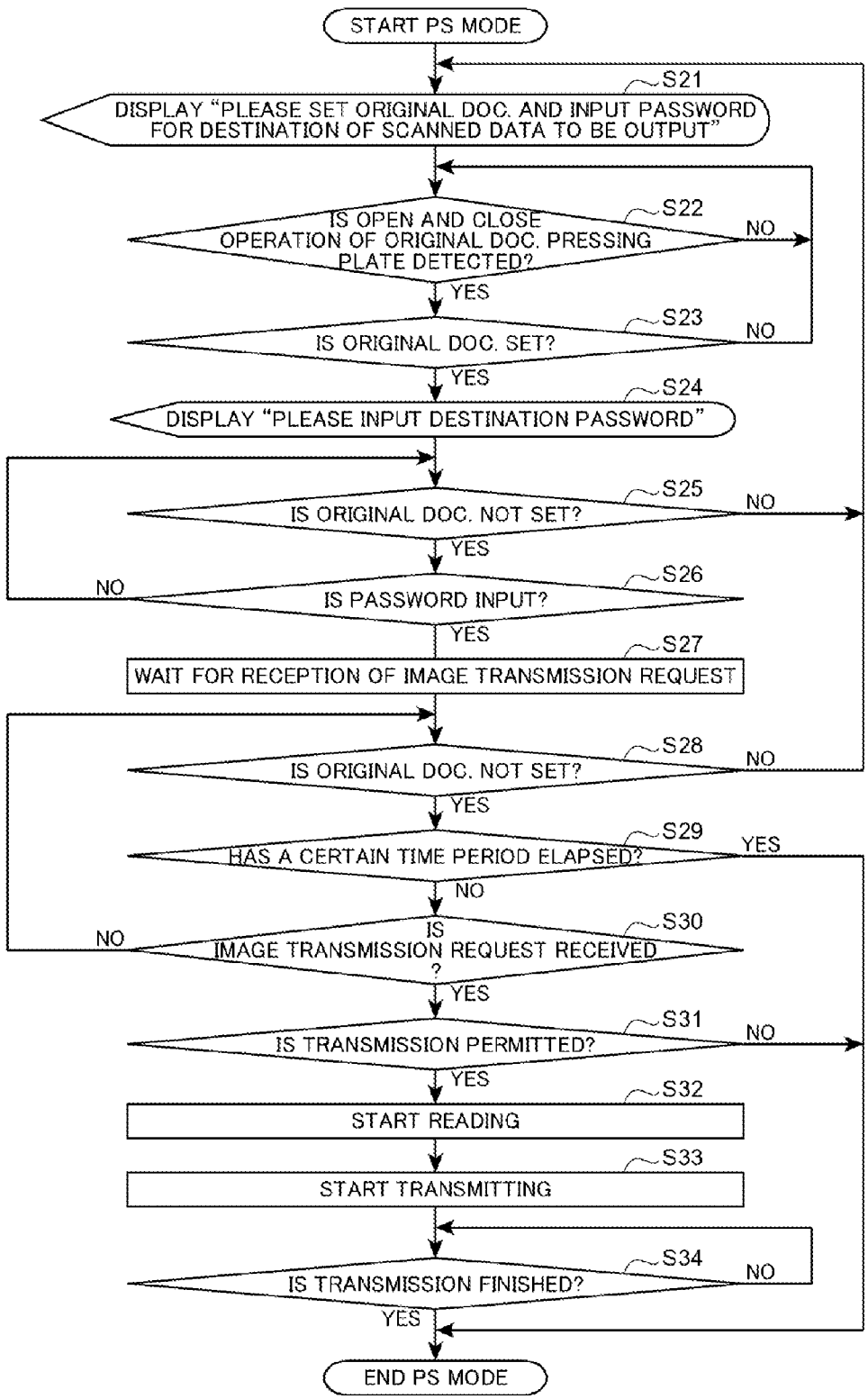
FIG. 17 is a flowchart illustrating an example operating procedure of the image transmission apparatus of FIG. 14.

Referring to a flowchart of FIG. 17, a description is given of an example operating procedure of the image transmission apparatus 10A shown in FIG. 14.

The example operating procedure of the image transmission apparatus 10A is described using an example case when the image data are transmitted to the personal computer 202 from the image transmission apparatus 10A based on the request from the personal computer 201.

The image transmission apparatus 10A enters into a personal scan mode (referred to as PS mode) when detecting a plurality of prescribed keys on the operation panel 11 as being pressed for a prescribed time period.

When a process of the PS mode in the flowchart of FIG. 17 is started, the image transmission apparatus 10A allows the display unit 11a to display "PLEASE SET ORIGINAL DOCUMENT AND INPUT PASSWORD FOR DESTINATION OF SCANNED DATA TO BE OUTPUT" thereon (step S21). The image transmission apparatus 10A allows a pressing plate open-close sensor 16c to detect the open and close operation of an original document pressing plate 16b (step S22). Where the open and close operation of the original document pressing plate 16b is detected (Yes in step S22), and where the original document is detected by the original document placement sensor 16d as being set on the image reading unit 16 (step S23), the image transmission apparatus 10A allows the display unit 11a to display "PLEASE INPUT DESTINATION PASSWORD" thereon (step S24). Where the open and close operation of the original document pressing plate 16b is not detected by the pressing plate open-close sensor 16c (No in step S22), or where the original document is not detected by the original document placement sensor 16d as being set on the original document table 16a of the image reading unit 16 (No in step S23), the flow returns to step S22.

After allowing the display unit 11a to display "PLEASE INPUT DESTINATION PASSWORD" thereon (step S24), the image transmission apparatus 10A determines whether or not the original document placement sensor 16d detects that the original document is not set on the original document table 16a of the image reading unit 16 (step S25). Where the original document is not set (No in step S25), the flow returns to step S21. Where the original document is set (Yes in step S25), the image transmission apparatus 10A determines whether or not the password relating to the destination is input in the operation panel 11, and whether or not the setting key 11e is pressed (step S26). Where the conditions of step 26 are not satisfied, the flow returns to step 25.

Herein, the operation of the image transmission apparatus 10A is described using an example case where the user sets the password relating to the personal computer 202 as the "PASSWORD" and transmits the image data to the personal computer 202. The image transmission apparatus 10A detects the input of the "PASSWORD" in the operation panel 11.

Herein, the display unit 11a on the display panel 11 is displaying "PASSWORD" as illustrated in FIG. 15. When the user removes the original document from the image reading unit 16, the image transmission apparatus 10A detects that the original document is not set on the original document table 16a of the image reading unit 16 by the original document placement sensor 16d, and the flow returns to step S21. The display unit 11a is again allowed to display "PLEASE SET ORIGINAL DOCUMENT AND INPUT PASSWORD FOR DESTINATION OF SCANNED DATA TO BE OUTPUT" thereon (step S21). Where the user presses the setting key 11e, that is, the conditions of step 26 are satisfied, flow proceeds to step S27.

Where the password is input in step S26, the receiving unit 13A of the image transmission apparatus 10A becomes in a reception waiting state of the image transmission request command CD30 as illustrated in FIG. 16 (step S27). The image transmission apparatus 10A determines by the original document placement sensor 16d whether or not the original document is not set on the original document table 16a of the image reading unit (step S28). Where the original document is not set (No in step S28), the flow returns to step S21. After the destination is input, the image transmission apparatus 10A determines whether a certain time period has elapsed without receiving the image transmission request command CD30 (step S29). Where the certain time period has elapsed (Yes in step S29), the flow of FIG. 17 is finished, thereby ending the PS mode and returning to a normal mode. The image transmission apparatus 10A determines whether or not the receiving unit 13 has received the image transmission request command CD30 as illustrated in FIG. 16 through the LAN 1 (step S30). Where the image transmission request command CD30 is not received (No in step 30), the flow returns to step S28.

Where the image transmission request command CD30 is received (Yes in step S30), on the other hand, the image transmission apparatus 10A transmits the received image transmission request command CD30 with respect to the transmission permitting unit 14A. The transmission permitting unit 14A determines whether or not the password for the destination input in the operation panel 11 and the password for the destination included in the image transmission request command CD30 received by the receiving unit 13A agree with each other (step S31). Where the password for the destination input in the operation panel 11 and the password for the destination included in the image transmission request command CD30 agree with each other (Yes in step S31), the transmission permitting unit 14A permits the transmission control unit 15 to transmit the image data. Where the password for the destination input in the operation panel 11 and the password for the destination included in the image transmission request command CD30 do not agree with each other (No in step S31), on the other hand, the flow of FIG. 17 is finished, thereby ending the PS mode and returning to the normal mode.

When the transmission of the image data is permitted by the transmission permitting unit 14A, the transmission control unit 15 instructs with respect to the image reading unit 16 to start reading the original document (step S32). Moreover, the transmission control unit 15 instructs with respect to the transmission unit 18 to transmit the image data to the destination address relating to the password for the destination set in the operation panel 11 (step S33). The image transmission apparatus 10A is on standby until the transmission of the image data is finished (step S34). Where the transmission is finished (Yes in step S34), the flow of FIG. 17 is finished, thereby ending the PS mode and returning to the normal mode.

Figure 18:
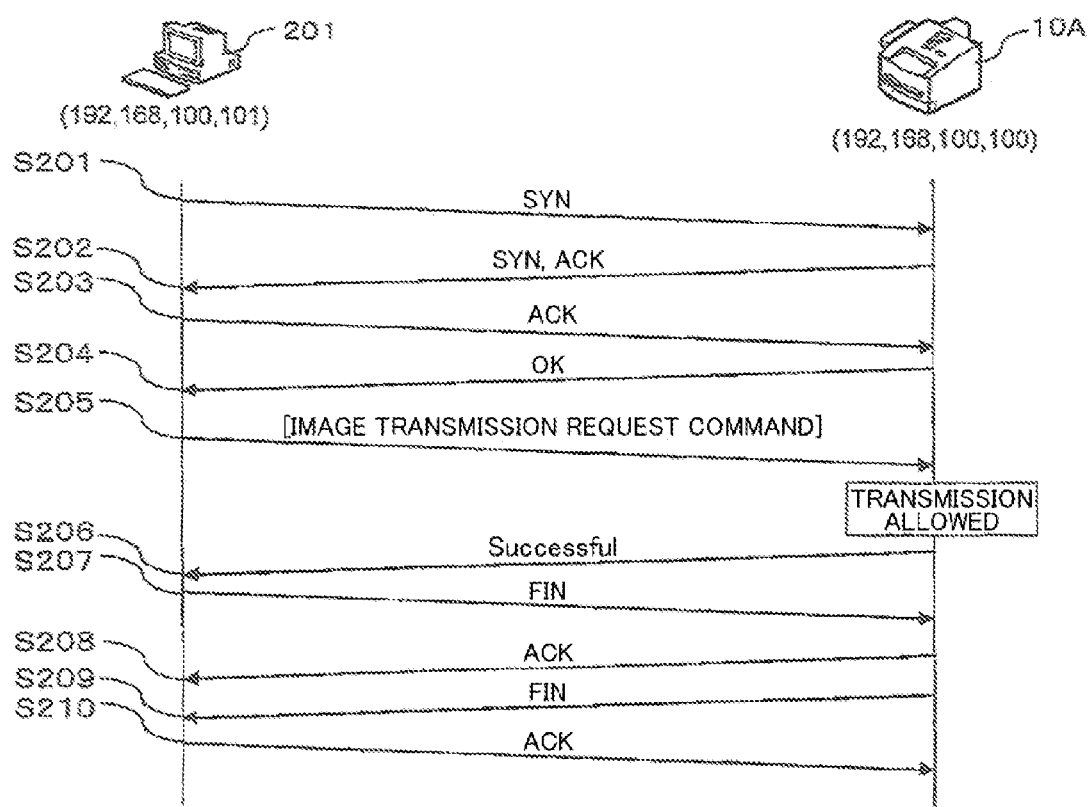
FIG. 18 is a schematic diagram illustrating a first communication procedure in a case where transmission is permitted by a transmission permitting unit in the image transmission apparatus of FIG. 14.
Figure 19:
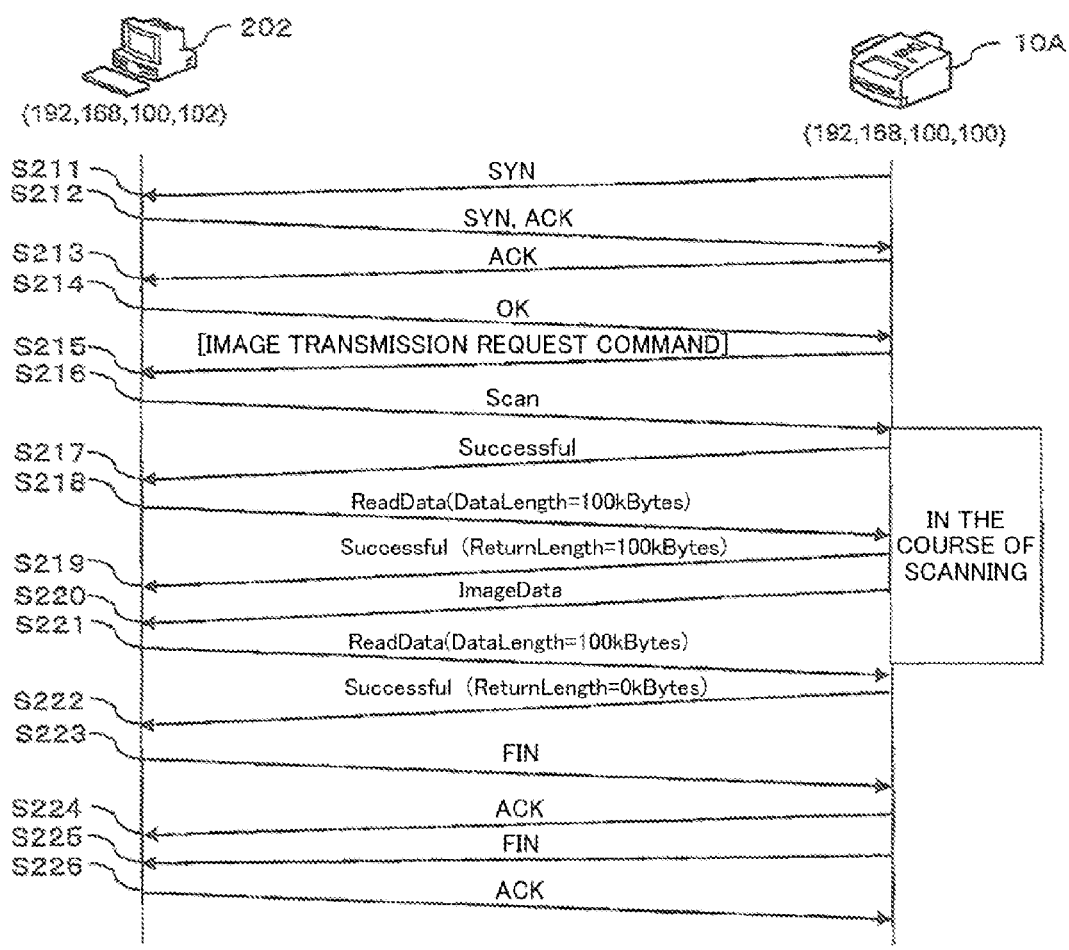
FIG. 19 is a schematic diagram illustrating a second communication procedure in a case where the transmission is permitted by the transmission permitting unit in the image transmission apparatus of FIG. 14.

Referring to FIGS. 18, 19, a description is given of an example communication procedure in a case where the transmission permitting unit 14A shown in FIG. 14 permits the transmission according to the second embodiment. Particularly, the description is given using: a first example procedure (with respect to FIG. 18) of communications between the image transmission apparatus 10A shown in FIG. 14 and the personal computer 201 shown in FIG. 6 when the image data are transmitted to the personal computer 202 in a normal manner based on the image transmission request command CD30 from the personal computer 201 in an attempt of the transmission of the image data to the personal computer 202 by the image transmission apparatus 10A; and a second example procedure (with respect to FIG. 19) of communications between the image transmission apparatus 10A and the personal computer 202.

In the first and second communication procedures according to the second embodiment, the commands (e.g., SYN, SYN and ACK, ACK, Successful, and FIN commands) similar to those used between the image transmission apparatus 10 and the personal computers 201, 202 in the first embodiment are used.

The communications between the image transmission apparatus 10A and the personal computer 201 are started in step S27 in the flowchart of FIG. 17.

In the first example communication procedure as illustrated in FIG. 18, when the personal computer 201 starts the communications with the image transmission apparatus 10A, the SYN command is transmitted from the personal computer 201 with respect to the image transmission apparatus 10A (step S201). The image transmission apparatus 10A receives the SYN command from the personal computer 201, and transmits the SYN and ACK command (step S202). Upon receiving the SYN and ACK command from the image transmission apparatus 10A, the personal computer 201 transmits the ACK command with respect to the image transmission apparatus 10A (step S203). Upon receiving the ACK command from the personal computer 201, the image transmission apparatus 10A returns an okay response (OK) to the personal computer 201 (step S204). At this point, a TCP connection is established between the image transmission apparatus 10A and the personal computer 201.

When the TCP connection is established between the image transmission apparatus 10A and the personal computer 201, the personal computer 201 transmits the image transmission request command CD30 as illustrated in FIG. 16 to the image transmission apparatus 10A (step S205). Where the password serving as the identification data input in the operation panel 11 of the image transmission apparatus 10A and the "PASSWORD" serving as the identification data CD32 included in the image transmission request command CD30 agree with each other, the image transmission apparatus 10A transmits the Successful command including the TWAIN command in the payload in the TCP to the personal computer 201 (step S206).

Since the image transmission request command CD30 is accepted, the personal computer 201 cuts the TCP connection established with the image transmission apparatus 10A towards the end of the procedure of FIG. 18. Herein, the personal computer 201 transmits the FIN command to the image transmission apparatus 10A (step S207). The image transmission apparatus 10A transmits the ACK command with respect to the personal computer 201 (step S208), and then transmits the FIN command with respect to the personal computer 201 (step S209). Upon receiving the FIN command from the image transmission apparatus 10A, the personal computer 201 transmits the ACK command to the image transmission apparatus 10A, and the cutting of the TCP connection is competed (step S210).

Subsequently, the image transmission apparatus 10A starts the second communication procedure to transmit the image data to the destination data CD31 included in the image transmission request command CD30. Since the destination data CD31 of the image transmission request command CD30 as illustrated in FIG. 16 includes the IP address "192.168.100.102" of the personal computer 202, the image transmission apparatus 10A starts the second communication procedure as illustrated in FIG. 19 to establish the TCP connection between the image transmission apparatus 10A and the personal computer 202.

In the procedure of FIG. 19, the SYN command is transmitted from the image transmission apparatus 10A to the personal computer 202 (step S211). Upon receiving the SYN command from the image transmission apparatus 10A, the personal computer 202 transmits the SYN and ACK command to the image transmission apparatus 10A (step S212). The image transmission apparatus 10A transmits the ACK command with respect to the personal computer 202 upon receiving the SYN and ACK command from the personal computer 202 (step S213). Upon receiving the ACK command from the image transmission apparatus 10A, the personal computer 202 returns an okay (OK) response to the image transmission apparatus 10A (step S214). At this point, the TCP connection is established between the image transmission apparatus 10A and the personal computer 202.

Subsequently the image transmission apparatus 10A notifies with respect to the personal computer 202 of "image transmissible" indicating that the image data are acquirable since the transmission of the image data to the personal computer 202 is permitted (step S215). Since the acquisition of the image data is permitted, the personal computer 202 transmits the Scan command including the TWAIN command in the payload in the TCP to the image transmission apparatus 10A (step S216). Upon receiving the Scan command from the personal computer 202, the image transmission apparatus 10A starts reading the original document, and transmits the Successful command including the TWAIN command in the payload in the TCP to the personal computer 202 (step S217). Subsequently, the personal computer 202 transmits the Read-Data command including the TWAIN command in the payload in the TCP to the image transmission apparatus 10A to read the image data from the image transmission apparatus 10A (step S218). Herein, the data having 100 kilo bytes are requested to be read in FIG. 19. The image transmission apparatus 10A transmits a readable image data size to the personal computer 202 with the Successful command including the TWAIN command in the payload in the TCP (step S219). The image transmission apparatus 10A continues to transmit ImageData which are read to the personal computer 202 (step S220). The personal computer 202 transmits the ReadData command of the image data and continues to read the image data.

In a case where no readable image data remains, the personal computer 202 transmits the ReadData command to the image transmission apparatus 10A (step S221), and is notified of zero (0) as the size of the image data read from the image transmission apparatus 10A (step S222). Accordingly, the personal computer 202 finishes the image data reading.

The personal computer 202 cuts the TCP connection established with the image transmission apparatus 10A towards the end of the procedure in FIG. 19. The personal computer 202 transmits the FIN command to the image transmission apparatus 10A (step S223). The image transmission apparatus 10A transmits the ACK command with respect to the personal computer 202 (step S224), and then transmits the FIN command with respect to the personal computer 202 (step S225). Upon receiving the FIN command from the image transmission apparatus 10A, the personal computer 202 transmits the ACK command to the image transmission apparatus 10A, and the cutting of the TCP connection is competed (step S226).

A description is given of an example communication procedure in a case where the transmission is rejected according to the second embodiment. The description is given using an example command serving as an image transmission request command CD40 transmitted from the personal computer 202 as illustrated in FIG. 20 and an example communication procedure as illustrated in FIG. 21.

The image transmission request command CD40 includes: a destination data CD41, an identification data CD42, a scan mode data CD43, a color mode data CD44, an original document size data CD45, and a resolution data CD46 as similar to the image transmission request command CD30 of FIG. 16. The identification data CD42 includes "PASSWORD" as illustrated in FIG. 20 unlike the identification data CD32 having the "PC202" as illustrated in FIG. 16.

Figure 21:
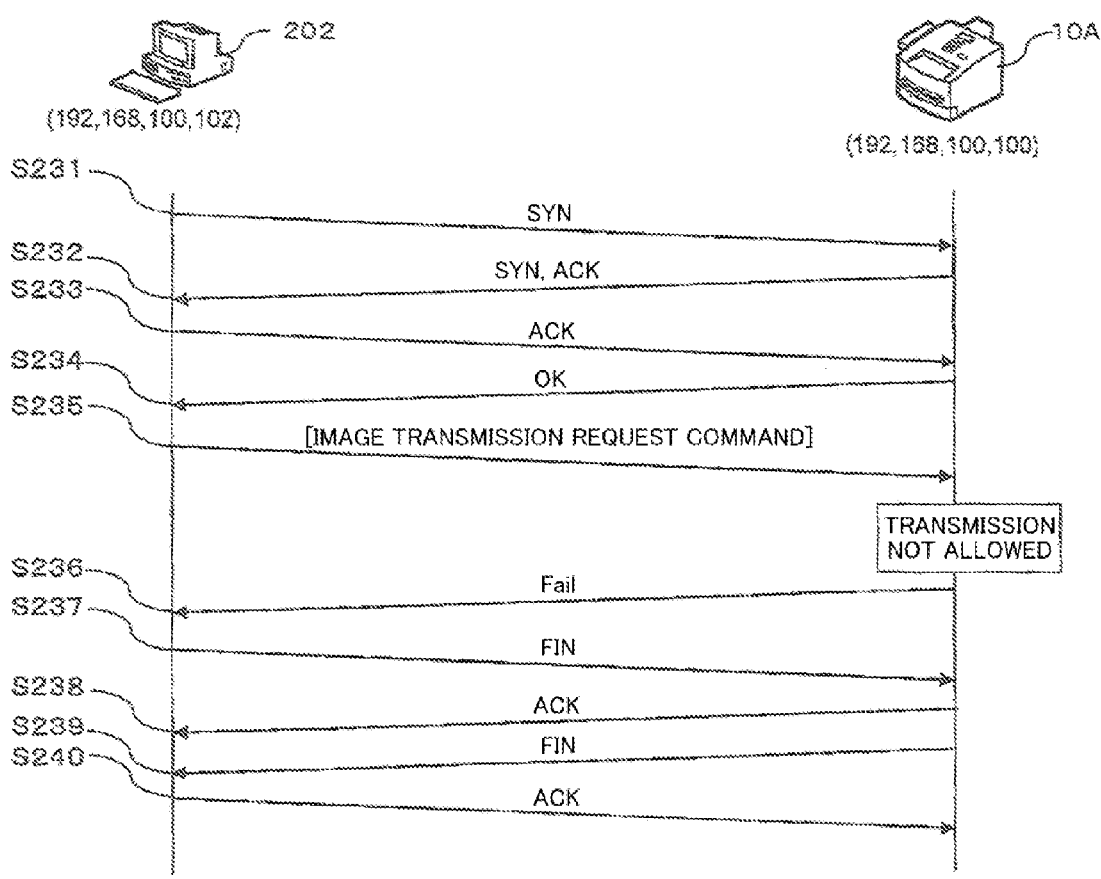
FIG. 21 is a schematic diagram illustrating a communication procedure in a case where the transmission is rejected by the transmission permitting unit in the image transmission apparatus of FIG. 14.

The example communication procedure in FIG. 21 illustrates in a case where the transmission is rejected by the transmission permitting unit 14 of FIG. 14 according to the second embodiment.

With reference to FIGS. 20, 21, the example communication procedure is described of the communications between the image transmission apparatus 10A and the personal computer 202 when the image transmission apparatus 10A receives the image transmission request command CD40 from the personal computer 202 after the identification data (e.g., "PASSWORD") are set in the image transmission apparatus 10A of FIG. 14. Particularly, the description is given of the communications between the image transmission apparatus 10A and the personal computer 202 when the image transmission apparatus 10A receives the image transmission request command CD40 including the identification data CD42 (e.g., PC 202) being different from the identification data which are set in the image transmission apparatus 10A.

When the personal computer 202 starts the communications with the image transmission apparatus 10A, a SYN command is transmitted from the personal computer 202 with respect to the image transmission apparatus 10A (step S231). The image transmission apparatus 10A receives the SYN command from the personal computer 202, and transmits a SYN and ACK command (step S232). Upon receiving the SYN and ACK command from the image transmission apparatus 10A, the personal computer 202 transmits an ACK command with respect to the image transmission apparatus 10A (step S233). Upon receiving the ACK command from the personal computer 202, the image transmission apparatus 10A returns an okay response (OK) to the personal computer 202 (step S234). At this point, a TCP connection is established between the image transmission apparatus 10A and the personal computer 202.

When the TCP connection is established between the image transmission apparatus 10A and the personal computer 202, the personal computer 202 transmits the image transmission request command CD40 as illustrated in FIG. 20 to the image transmission apparatus 10A (step S235). Herein, the image transmission request command CD40 as illustrated in FIG. 20 includes the identification data CD42 having the "PC202" therein. The identification data CD42, however, does not agree with the "PASSWORD" serving as the identification data input in the operation panel 11 of the image transmission apparatus 10A. Accordingly, the image transmission apparatus 10A returns a Fail command including the TWAIN command in the payload in the TCP to the personal computer 202 to inform the rejection of the image data reading (step S236).

Subsequently, the personal computer 202 cuts the TCP connection established with the image transmission apparatus 10A towards the end of the procedure in FIG. 21. Herein, the personal computer 202 transmits a FIN command to the image transmission apparatus 10A (step S237). The image transmission apparatus 10A transmits the ACK command with respect to the personal computer 202 (step S238), and then transmits the FIN command with respect to the personal computer 202 (step S239). Upon receiving the FIN command from the image transmission apparatus 10A, the personal computer 202 transmits the ACK command to the image transmission apparatus 10A, and the cutting of the TCP connection is competed (step S240).

According to the image transmission apparatus 10A of the second embodiment, therefore, the identification data (e.g., "PASSWORD") of the destination input in the operation panel 11 and the identification data CD32 (e.g., "PASSWORD") of the image transmission request command CD30 are compared, and the image data are transmitted to the destination where the identification data and the identification data CD32 agree with each other. Therefore, the image transmission apparatus 10A can transmit the image data to the destination intended to be the destination of the image data, thereby reducing the wrong transmission of the image based on the requests from the unintended personal computer 201 or 202. Since the image transmission request command CD30 includes the destination data CD31 and the identification data CD32, the image data can be transmitted in case where a personal computer (e.g., personal computer 201) serving as a requester of the image data transmission and a personal computer (e.g., personal computer 202) serving as a destination of the image data are different from each other.

A description is now given of modification of the second embodiment.

The image transmission apparatus 10A uses the password as the identification data to determine whether or not to transmit the image data according to the second embodiment. However, information, serving as the identification data, known only by the user attempting to transmit the data can be included in the image transmission request commands CD30. The modification of the second embodiment can provide an advantage similar to that provided according to the second embodiment.

Third Embodiment

Referring to FIG. 21, an image transmission apparatus 10B according to a third embodiment of this invention is illustrated. Components similar to that illustrated in FIG. 14 of the second embodiment will be given the same reference numerals.

In the image transmission apparatus 10B of the third embodiment, a transmission control unit 15 is connected with a peripheral device 30 (e.g., storage) through a local interface 19. The local interface 19 is, for example, a universal serial bus (USB), and can transmit image data to be transmitted to the transmission unit 18 to the storage 30. Other components and configurations of the image transmission apparatus 10B according to the third embodiment are similar to those of the image transmission apparatus 10A according to the second embodiment, and descriptions thereof are omitted for the sake of simplicity.

A description is now given of operation of the third embodiment.

In case where an IP address "192.168.100.100" of the image transmission apparatus 10B is designated in a destination data CD31 included in an image transmission request command CD30 to be transmitted to the image transmission apparatus 10B from the personal computers 201, 202, the image data read by an image reading unit 16 and stored in an image memory 17 are stored in the storage 30 through the transmission control unit 15 and the local interface 19.

According to the second embodiment described above, the destination of the image data is personal computer 201 or 202. According to the third embodiment, on the other hand, the image data can be transmitted to and stored in the storage 30 connected to the image transmission apparatus 10B, thereby enhancing the utilization of the image data.

A description is now given of modification of the third embodiment.

The storage 30 is connected to the image transmission apparatus 10B according to the third embodiment. However, another peripheral device can be connected to the image transmission apparatus 10B instead of the storage 30. Moreover, in addition to the personal computers 201, 202, or the peripheral device such as the storage 30, a device or a storage unit on the network such as the LAN 1 can serve as the destination of the image data.

This invention has been described above with regard to the first, second, and third embodiments, and the modifications thereof, but this invention is not limited thereto. For example, this invention can be modified, or various utilization of this invention can be allowed as follows.

Figure 22:
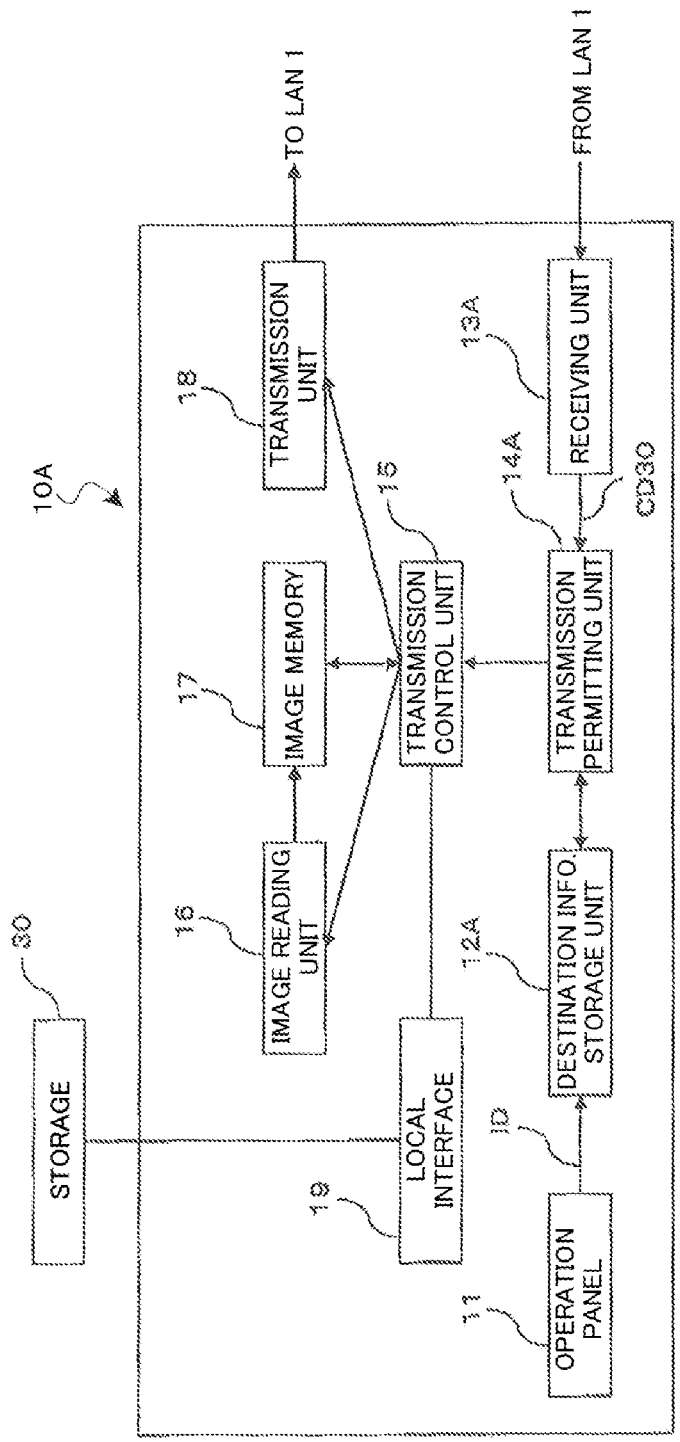
FIG. 22 is a schematic diagram illustrating an image transmission apparatus according to a third embodiment of this invention.

The structures of the image transmission apparatuses 10, 10A, and 10B can be changed other than respective FIGS. 1, 14, and 22 described above. Moreover, the communications between the image transmission apparatuses 10, 10A, and 10B and the personal computers 201, 202 can be changed other than the example communication procedures described above with reference to the respective drawings.

The image processing apparatus serving as the image transmission requester can be a terminal other than the personal computers 201, 202 described above.

Each of the image transmission apparatuses 10, 10A, and 10B can be applied to a multi-functional peripheral (MFP), a photocopier, and a facsimile device and the like other than the scanner described above.

In addition to the designation of the above flat-bed method by which the original document is manually placed to be read by the image reading unit 16, each of the image transmission apparatuses 10, 10A, and 10B can allow the automatic document feeder (ADF) to be designated to automatically feed the original document and can allow the reading unit 16 to read the original document. In a case where the ADF is designated, an original document stacking portion sensor can be disposed in the ADF to determine whether or not the original document is set in an original document stacking portion of the ADF. Accordingly the original document stacking sensor can detect the replacement of the original document instead of the pressing plate open-close sensor 16 described above.

Each of the image transmission apparatuses 10, 10A, and 10B allows the original document placement sensor 16d to determine whether or not the original document placed on the original document table 16a is changed. However, each of the image transmission apparatuses 10, 10A, and 10B can determine whether or not the original document is changed by detecting the presence or absence of the open and close operation of the pressing plate open-close sensor 16c.

As can be appreciated by those skilled in the art, numerous additional modifications and variation of this invention are possible in light of the above-described teachings. It is therefore to be understood that, within the scope of the appended claims, the disclosure of this patent specification may be practiced otherwise than as specifically described herein.

What is claimed is:

1. An image transmission apparatus comprising:
   an original document reading unit configured to read an original document, and produce image data;
   an operation unit configured to receive an input of a first password;
   a receiving unit configured to receive request information including a second password from an information processing apparatus;
   a control unit configured to control the original document reading unit to read the original document based on the request information, and transmit the image data to an external device; and
   a detection unit configured to detect the original document loaded on the original document reading unit, wherein the control unit restricts transmission of the image data to the external device if the first password does not correspond to the second password, wherein the control unit controls to switch modes of the image transmission apparatus between a first mode and a second mode,
   wherein the first mode represents a mode in which the control unit allows the original document reading unit to be on standby for reading the original document based on the request information, and the second mode is a mode different from the first mode, wherein the request information further includes reading condition information indicating original document reading condition, and wherein the original document reading unit reads the original document on the original document reading condition indicated by the reading condition information; and
   wherein the operation unit receives an instruction input to enter into the first mode,
   wherein, after the operation unit receives the instruction input and the detection unit detects the original document, the operation unit allows an input of the first password.

2. The image transmission apparatus according to claim 1, wherein the external device is the information processing apparatus.

3. The image transmission apparatus according to claim 1, wherein the external device is a device different from the information processing apparatus.

4. The image transmission apparatus according to claim 1, wherein the original document reading condition is a reading resolution.

5. The image transmission apparatus according to claim 1 wherein, in a case where the detection unit does not detect the original document after the operation unit receives the input of the first password, the operation unit receives re-input of the first password after the detection unit detects again the original document.

6. The image transmission apparatus according to claim 1, further comprising: an original document open-close plate pressing the original document to be read by the image reading unit, and an open-close sensor detecting an open and close operation of the original document open-close plate, wherein, after the operation unit receives the instruction input, when the open-close sensor detects the open and close operation of the original document open-close plate and the detection unit detects the original document, the operation unit allows the first password to be input.

7. An image transmission apparatus comprising:
- an original document reading unit configured to read an original document and produce image data;
- an operation unit configured to receive an input of first identification information;
- a receiving unit configured to receive request information including second identification information from an information processing apparatus; and
- a control unit configured to switch modes of the image transmission apparatus between a first mode and a second mode, wherein the first mode represents a mode in which the control unit allows the original document reading unit to be on standby for reading the original document based on the request information, and the second mode is a mode different from the first mode,
- wherein the operation unit receives an instruction input to enter into the first mode, wherein the control unit switches the mode of the image transmission apparatus to the first mode when the operation unit receives the instruction input,
- wherein, if the mode of the image transmission apparatus is the first mode, the control unit controls the original document reading unit to read the original document based on image request information, and transmits the image data to the information processing apparatus, and
- wherein the request information further includes reading condition information indicating original document reading condition, and wherein the original document reading unit reads the original document on original document reading condition indicated by the reading condition information;
- wherein, if the first identification information does not correspond to the second identification information in the first mode, the control unit restricts transmission of the image data to the information processing apparatus, and allows the image forming apparatus to exit from the first mode and enter into the second mode.

8. The image transmission apparatus according to claim 7, wherein the first identification information and the second identification information is information for identifying the information processing apparatus.

9. The image transmission apparatus according to claim 7, wherein the first identification information and the second identification information is a password.

10. The image transmission apparatus according to claim 7, wherein the original document reading condition is a reading resolution.

11. The image transmission apparatus according to claim 7, wherein the control unit receives an input of the first identification information in a case where the mode of the image transmission apparatus is the first mode.

12. The image transmission apparatus according to claim 7, wherein the control unit allows the image transmission apparatus to enter into the first mode when a plurality of prescribed keys are simultaneously pressed for a prescribed time period at the operation unit.

* * * * *